US008310577B1

(12) United States Patent
Neter

(10) Patent No.: US 8,310,577 B1
(45) Date of Patent: *Nov. 13, 2012

(54) METHOD AND APPARATUS FOR COLOR COMPENSATION

(75) Inventor: Sarit Neter, Irvine, CA (US)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,971

(22) Filed: Feb. 2, 2000

Related U.S. Application Data

(60) Provisional application No. 60/149,796, filed on Aug. 19, 1999.

(51) Int. Cl.
*H04N 3/14* (2006.01)

(52) U.S. Cl. .......................................... 348/308

(58) Field of Classification Search .............. 348/221.1, 348/223.1, 229.1, 266, 279, 280, 272
See application file for complete search history.

(56) References Cited

U.S. PATENT DOCUMENTS

| | | | | |
|---|---|---|---|---|
| 3,971,065 | A | * | 7/1976 | Bayer ........................ 348/276 |
| 4,176,373 | A | * | 11/1979 | Dillon et al. ............... 348/253 |
| 4,245,241 | A | | 1/1981 | Sato et al. |
| 4,300,163 | A | | 11/1981 | Wada et al. |
| 4,580,160 | A | | 4/1986 | Ochi et al. |
| 4,709,259 | A | | 11/1987 | Suzuki |
| 4,768,085 | A | * | 8/1988 | Hashimoto ................. 348/237 |
| 4,774,565 | A | | 9/1988 | Freeman |
| 4,805,023 | A | | 2/1989 | Younse et al. |
| 4,930,006 | A | | 5/1990 | Murayama et al. |
| 4,996,413 | A | | 2/1991 | McDaniel |
| 5,008,739 | A | | 4/1991 | D'Luna et al. |
| 5,262,871 | A | | 11/1993 | Wilder et al. |
| 5,282,025 | A | * | 1/1994 | Sato .............................. 348/273 |
| 5,329,312 | A | * | 7/1994 | Boisvert et al. .............. 348/256 |
| 5,355,164 | A | | 10/1994 | Shimoyama et al. |
| 5,373,322 | A | | 12/1994 | Laroche et al. |
| 5,382,976 | A | | 1/1995 | Hibbard |
| 5,392,070 | A | | 2/1995 | Endo et al. |
| 5,408,422 | A | | 4/1995 | Takatori et al. |
| 5,418,565 | A | | 5/1995 | Smith |
| 5,475,769 | A | | 12/1995 | Wober et al. |
| 5,541,654 | A | * | 7/1996 | Roberts ........................ 348/301 |
| 5,548,331 | A | | 8/1996 | Kawahara et al. |
| 5,555,023 | A | | 9/1996 | Maenaka et al. |
| 5,640,202 | A | | 6/1997 | Kondo et al. |

(Continued)

FOREIGN PATENT DOCUMENTS

JP 08261512 10/1996

(Continued)

OTHER PUBLICATIONS

Frame-transfer CMOS active pixel sensor with pixel binning Zhimin Zhou; Pain, B.; Fossum, E.R.; Electron Devices, IEEE Transactions on , vol. 44 , Issue: 10 , Oct. 1997 pp. 1764-1768.*

(Continued)

*Primary Examiner* — Timothy J Henn
(74) *Attorney, Agent, or Firm* — Stolowitz Ford Cowger LLP

(57) ABSTRACT

An imaging method and system that flexibly accesses light sensor elements and processes imaging signals. The imaging system comprises an array of pixel sensor cells, an array controller and a readout control circuit. The imaging system provides color compensation.

30 Claims, 29 Drawing Sheets

U.S. PATENT DOCUMENTS

| | | | |
|---|---|---|---|
| 5,712,682 | A | 1/1998 | Hannah |
| 5,771,070 | A | 6/1998 | Ohzu et al. |
| 5,781,233 | A | 7/1998 | Liang et al. |
| 5,790,191 | A * | 8/1998 | Zhang ............................ 348/300 |
| 5,841,126 | A | 11/1998 | Fossum et al. |
| 6,069,351 | A | 5/2000 | Mack |
| 6,130,960 | A | 10/2000 | Acharya |
| 6,133,954 | A | 10/2000 | Jie et al. |
| 6,141,049 | A * | 10/2000 | Harada ......................... 348/296 |
| 6,166,367 | A | 12/2000 | Cho |
| 6,226,034 | B1 | 5/2001 | Katayama |
| 6,441,851 | B1 | 8/2002 | Yonemoto |
| 6,445,413 | B1 | 9/2002 | Hosier |
| 6,466,265 | B1 | 10/2002 | Lee et al. |
| 6,496,224 | B2 | 12/2002 | Ueno |
| 6,519,000 | B1 | 2/2003 | Udagawa |
| 6,522,355 | B1 | 2/2003 | Hynecek |
| 6,529,243 | B1 * | 3/2003 | von Stein et al. ............. 348/340 |
| 6,580,456 | B1 | 6/2003 | Jacobs |
| 6,590,198 | B1 | 7/2003 | Zarnowski et al. |
| 6,618,081 | B1 | 9/2003 | Harada et al. |
| 6,819,358 | B1 | 11/2004 | Kagle et al. |
| 6,888,568 | B1 | 5/2005 | Neter |
| 6,965,395 | B1 | 11/2005 | Neter |
| 7,133,073 | B1 | 11/2006 | Neter |
| 7,142,233 | B1 * | 11/2006 | Ogawa et al. ............. 348/222.1 |
| 7,623,163 | B2 | 11/2009 | Neter |
| 8,164,665 | B2 | 4/2012 | Neter |
| 2001/0010551 | A1 | 8/2001 | Dierickx |
| 2001/0013894 | A1 | 8/2001 | Parulski et al. |
| 2004/0080636 | A1 | 4/2004 | Dong |
| 2007/0052813 | A1 | 3/2007 | Neter |

FOREIGN PATENT DOCUMENTS

| | | |
|---|---|---|
| WO | 0113649 | 2/2001 |

OTHER PUBLICATIONS

Submicron spaced lens array process technology for a high photosensitivity CCD image sensor Sano, Y. et al. Electron Devices Meeting, 1990. Technical Digest., International , Dec. 9-12, 1990.*

Multiresolution image sensor Kemeny, S.E.; Panicacci, R.; Pain, B.; Matthies, L.; Fossum, E.R.; Circuits and Systems for Video Technology, IEEE Transactions on , vol. 7 , Issue: 4 , Aug. 1997; pp. 575-583.*

Submicron Spaced Lens Array Process Technology for a High Photosensitivity CCD Image Sensor Sano, Y.; Nomura, T.; Aoki, H.; Terakawa, S.; Kodama, H.; Aoki, T.; Hiroshima, Y IEEE Electron Devices Meeting, Technical Digest, Dec. 1990; pp. 11.5.1-11.5.4.*

Frame-transfer CMOS active pixel sensor with pixel binning Zhimin Zhou; Pain, B.; Fossum, E.R.; Electron Devices, IEEE Transactions on , vol. 44 , Issue: 10 , Oct. 1997; pp. 1764-1768.*

Sano et al., "Submicron Spaced Lens Array Process Technology for a High Photosensitivity CCD Image Sensor", IEEE Electron Devices Meeting, Technical Digest, Dec. 1990. pp. 11.5.1-11.5.4.

Zhimin Zhou, et al., "Frame-Transfer CMOS Active Pixel Sensor With Pixel Binning", IEEE Transaction on Electron Devices, Oct. 1997, vol. 44, No. 10, pp. 1764-1786.

Co-pending U.S. Appl. No. 09/496,607, filed Feb. 2, 2000, including specification in 36 pages and 29 sheets of drawings, U.S. Appl. 09/496,533, filed Feb. 2, 2000, including specification in 36 pages and 29 sheets of drawings and U.S. Appl. No. 09/496,364, filed Feb. 2, 2000, including specification in 36 pages and 29 sheets of drawings.

USPTO; International Search Authority; PCT/US00/22772 International Preliminary Examination Report; Oct. 15, 2001; 8 Pages.

Stolowitz Ford Cowger LLP; Related Case Listing; Jul. 28, 2011; 1 Page.

* cited by examiner

METHOD AND APPARATUS FOR COLOR COMPENSATION

CLAIM OF PRIORITY

This patent application claims the benefit of U.S. Provisional Application No. 60/149,796 filed Aug. 19, 1999, which is hereby incorporated herein by reference in its entirety.

BACKGROUND OF THE INVENTION

1. Field of the Invention

The present invention relates to imaging systems, and in particular, to methods and systems for color compensation.

2. Description of the Related Art

Conventional integrated circuit imaging devices include an array of light detecting elements or pixels which are interconnected to generate a signal representation of an image illuminating the device. Two common examples of conventional integrated circuit imaging devices are a charge coupled device (CCD) and a complementary metal oxide semiconductor (CMOS) image sensing device. Conventional imaging devices use one or more light detecting elements and charge storage elements. In order to produce a color image, the imaging devices separate the light into various color components by filtering the light before the light strikes the light detecting elements. The array of light detecting elements is often deposited with a filter layer such that neighboring pixels may have different color filters and organized in a particular pattern.

Because each pixel is only capable of detecting a single color, conventional imaging devices require a process by which all of the color components are reconstructed for each pixel in order to maintain the original unfiltered array resolution. To reconstruct the color components, conventional imaging devices use a process of color interpolation that is performed after an analog signal associated with each pixel has been digitized. The conventional process of color interpolation performed after an analog signal associated with each pixel has been digitized requires conversion from analog to digital (A/D) and may require extensive computations in order to achieve a high quality color presentation of the image. The A/D conversion and extensive computations may require hardware, such as analog-to-digital (A/D) converters, memory, processors and software. The hardware and software may add to the complexity, size and expense of the imaging device and reduce the speed of the imaging process.

Conventional imaging devices also require color compensation for differences in the response of the various color filters and for variations within the integrated circuit sensor array, such as process, materials, temperature or manufacturing. For example, when the primary color scheme is used, the response of an element that absorbs red light may be different than an element that absorbs blue light even when illuminated by light of equal red and blue luminosity levels. When exposed to a flat light image having equal intensity and chromatisity levels throughout, typical CMOS or CCD arrays may generate analog signals having significant magnitude variations for the different color components. Accordingly, if the analog signals are used to reproduce the original image, the reproduced image colors will not match the original colors.

To overcome this problem, conventional imaging devices employ a process of color correction that is performed after the analog signals for each pixel have been digitized. One drawback of the conventional color correction process is a loss in color dynamic range that results from under-utilization of the A/D converter for some of the color components. Another drawback is increased computations that translates into additional hardware, size, expense and/or reduced speed.

The effect of loss in color dynamic range is particularly noticeable in the low light areas of an image that contains low as well as high light regions. The human eye is sensitive to minute changes in hue and saturation levels. A reduction in color component dynamic range may result in less vivid, plain, or flat images. Attempts to correct this via hue or saturation enhancement filters may cause color distortion rather than color restoration.

Another color compensation that integrated circuit color imaging devices require is for different illumination temperatures. The hue of a color component changes with respect to the ambient illumination. Thus, a white object under sunlight conditions is perceived by the imaging device as white, but under fluorescent light conditions is perceived as light green.

To overcome this problem, conventional integrated circuit color imaging devices employ a process of white balance that is performed after the analog signals for each pixel have been digitized. Typically, each of the three processed color components, red, green or blue, is a convolution of the three colors. A drawback of the conventional white balance process is increased computations that translates into additional hardware and/or reduced speed.

The collection of signals read from the pixels represents the image viewed by the array. Each pixel represents a sample of the image and hence is a data value in the two-dimension image produced by the imaging system. Defect pixels, referred to as 'bad pixels,' do not contain a correct value and appear as artifacts. The bad pixels can reduce the image quality significantly. A bad pixel is caused by array defect and produces an output signal that significantly deviates from the mean output level of adjacent pixels when the exposure level of all pixels is substantially unified. Pixels that are significantly brighter than adjacent pixels in a unified dark frame are referred to as 'hot pixels,' while pixels that are significantly darker than adjacent pixels in a unified bright frame are referred to as 'dead pixels.'

The defect pixels are typically distributed in a random manner. However, a bad column (i.e.—a complete column is defective), or a blemish (i.e.—a cluster of neighboring pixels is defective) may occur and are typically discarded by the manufacturer. The manufacturer releases sensor arrays that contain random defect pixels in an amount that does not exceed a given limit, and the bad pixels are typically corrected. Both CCD and CMOS integrated circuit color imaging devices employ a process of bad pixel detection and correction. Conventionally, the detection step is performed off-line by the manufacturer. A bad pixel list is stored in the device. The correction step is typically performed after the analog signal for each pixel has been digitized.

SUMMARY OF THE INVENTION

The present invention is directed to imaging methods and systems for flexibly addressing and processing imaging pixel sensor elements. The novel architecture of the present invention allows for a highly integrated, low cost imager with high speed performance and good image quality. For example, the imaging system provides on-the-fly color interpolation, color compensation (also called color correction, color maximization or white balance) and/or fixed pattern noise reduction. The hardware and/or software related to on-the-fly color interpolation, color compensation and/or fixed pattern noise reduction may be provided on-chip.

One embodiment of an imaging system in accordance with the present invention comprises an array of pixel sensor cells arranged in rows and columns, a plurality of detection circuits, an array controller, a control circuit that allows for various programmable modes of pixel readout, and a programmable amplification stage that may be adjusted per pixel or per group of pixels. In accordance with one embodiment, the imaging system further includes a color filter layer deposited on the sensor array. The color filter may comprise, for example, Red, Green, and Blue filters organized in the Bayer pattern scheme. In one embodiment, the system further contains a circuit for performing one or more averaging operations.

One aspect of the present invention relates to an on-the-fly color interpolation apparatus and process that comprises a color reconstruction procedure performed during the sensor readout stage. The on-the-fly color interpolation process is capable of reading two or more consecutive rows and two or more consecutive columns simultaneously, summing some of the signals, and independently amplifying the signals with an optionally programmable gain amplifier. The on-the-fly color interpolation process is advantageously performed in an analog domain before an analog-to-digital conversion.

The on-the-fly color interpolation process of the present invention provides high speed of operation and reduced computational complexity with good color image quality. The on-the-fly color interpolation process is advantageously suited for many imaging applications today that do not require high color precision or high image quality, as well as those which do. For example, some high quality, digital cameras have modes of operation such as a 'preview' mode where image quality is less important than speed and implementation complexity.

One embodiment of the on-the-fly color interpolation process provides at least two modes of operation: a full resolution mode and a sub-sampling mode. Full resolution mode is preferably used when high image quality is desired. In full resolution mode, each Red-Green-Blue (RGB) triplet needed for a color pixel representation is produced from a group of 2×2 pixels within the Bayer pattern. The four pixels are read out simultaneously, the two diagonally neighboring Green pixels are summed together, and the gain associated with the Green pixels is reduced in half. The resulting Green component is sent out with the diagonally neighboring Red and Blue pixels to produce one RGB triplet. Each subsequent RGB triplet shares one of the Green pixels and either the Red or Blue pixel of the preceding RGB triplet.

The sub-sampling mode may be used when a lower resolution image is desired, such as when a user previews an image. Sub-sampling is achieved via skipping pixels along the horizontal and/or the vertical axis of the pixel array. For a sub-sampling ratio of 1:j vertically and 1:k horizontally, where j, k are even, each RGB triplet that is needed for a color pixel representation is produced from a group of j by k pixels with the Bayer pattern. All Green pixels in the j*k neighborhood are averaged to produce the green component. Similarly, all of the Red pixels in the same neighborhood are averaged to produce the Red component, and all Blue pixels in the neighborhood are averaged to produce the Blue component. The three components are then sent out as the RGB triplet representing the j by k group of pixels. The sub-sampling process can be achieved by reading the j rows simultaneously.

Both the full resolution and the sub-sampling modes of operation can be further combined with a window readout mode where only a sub-region of the whole sensor array is read.

Another aspect of the present invention relates to an apparatus and process for color compensation or maximization. The color compensation process compensates for differences in the response of various color filters and variations within the integrated circuit sensor array, such as process, materials, temperature or manufacturing. The color compensation process of the present invention improves color dynamic range, decreases computations and hardware and improves speed of operation. The color compensation process of the present invention is advantageously performed in the analog domain before an analog-to-digital conversion. The color compensation process of the present invention also improves white balance which is used to compensate colors for different illumination temperatures.

In one embodiment, the imaging system with color compensation includes a control circuit that provides four output paths that can be amplified separately via one or more stages of programmable gain amplifiers and/or summing amplifiers. The control circuit allows four independent readouts for even rows, odd rows, even columns and odd columns, thus providing separate and/or simultaneous output paths for Red, Green and Blue pixels.

For example, one embodiment of the imaging system employs a readout control that provides outputs for the Red pixel, the Blue pixel, and the two Green pixels. Thus, the imaging system allows further gain compensation for a Green pixel that resides in an even column compared to a Green pixel that resides in an odd column. The four signals are then amplified via four corresponding programmable gain amplifiers. The readout control logic ensures that the row and column switches are closed in the appropriate sequence.

The present invention does not require the integrated color imaging system to employ a simultaneous readout of the n-by-n pixel block. A 'pipeline' approach may be utilized instead of a parallel readout. The pipeline approach uses one or more analog line storage units, e.g., capacitors. For example, in one embodiment using the Bayer color pattern, two line storage units are used. The first of two consecutive lines that is readout from the array is stored in the first line storage unit. The second line is averaged with the stored line to produce the RGB triplets, while a "first" line of the next two consecutive lines is readout and stored in the second line storage unit and so on. Thus, the two line storage units are used in a 'ping pong' fashion.

The imaging system does not restrict the type of transfer function that is implemented in the programmable gain amplifiers. Each of the four amplifiers can implement a different transfer function such as log or an exponent where the power value is programmable. Thus, each color can be optimized independently for maximum dynamic range.

In one embodiment of the imaging system with color compensation, the imaging system further employs several gain stages for color convolutions associated with white balance. The imaging system employs a readout control that provides three outputs for the Red pixel, the Blue pixel, and either the even Green pixel or the odd Green pixel via a multiplexor. The three output signals are then amplified via nine programmable gain amplifiers and summed via three summing amplifiers accordingly. The readout control logic ensures that the row and column switches are closed in the appropriate sequence.

Another aspect of the invention relates to a fixed pattern noise reduction apparatus and process. The fixed pattern noise reduction process reduces noise related to pixel-to-pixel variation. This variation is primarily due to dark current leakage, which may be integrated together with the signal and hence contaminate the signal. The dark current leakage may be due to thermal generation in the neutral bulk material, in the depletion region and due to surface states. The dark current level may vary between pixels and may be particularly noticeable between columns due to column buffers.

The fixed pattern noise reduction process of the present invention allows increased dynamic range (high image quality), high speed of operation and reduced computational complexity. The fixed pattern noise reduction of the present invention is advantageously performed in the analog domain before an analog-to-digital conversion.

In the imaging system of the present invention with fixed pattern noise reduction, the array of pixels comprises a group of exposed pixels and a group of dark pixels. In one embodiment, the dark pixels are deposited with an opaque mask layer and thus are not exposed to light. In one embodiment, the programmable readout control circuit has a programmable non-destructive readout mode.

In one embodiment, the array includes a row of dark pixels. Each image pixel value is produced from a combination of an exposed pixel and a dark pixel that resides in the same column. The two pixels are read simultaneously, and the dark value is subtracted from the exposed value. In another embodiment, the array includes several rows of dark pixels.

In one embodiment, the imaging system produces a black and white image. In another embodiment, the imaging system further comprises a color filter layer deposited on the exposed pixel sensor elements. In one embodiment, the color filter layer comprises Red, Green, and Blue filters organized in the Bayer pattern. In another embodiment, the color filter layer comprises Yellow, Cyan and Magenta filters.

In other embodiments, other color filter systems and/or other patterns or configurations may be used. In addition, other embodiments of the imaging system do not have pixels organized in a rectangular matrix.

In one embodiment, at least a portion of the sensor cells are active. In another embodiment, at least a portion of the sensor cells are passive.

The imaging system in accordance with the present invention may also include additional on-chip or off-chip amplification stages, analog-to-digital conversion units, memory units and various other signal processing blocks. In one embodiment, the imaging system further comprises a microlenses layer.

In one embodiment, the imaging system further contains a control circuit that allows for special pixel readout modes and a circuit for performing an averaging and/or a subtraction operation.

In one embodiment, the imaging system employs an on-the-fly fixed pattern noise reduction process that subtracts dark current during the sensor readout stage. The on-the-fly fixed pattern noise reduction process is capable of reading two consecutive rows simultaneously by a readout shift register and a row readout control, re-reading a dark row together with an exposed row, subtracting a dark row value from an exposed row value with a summing amplifier and amplifying the difference with a programmable gain amplifier.

In another embodiment, the imaging system employs a mode of on-the-fly fixed pattern noise reduction that subtracts a dark current average value during the sensor readout stage. The imaging system is capable of reading three consecutive rows simultaneously by a column shift register and a row readout control, re-reading the dark rows together with an exposed row, averaging the dark rows with a summing amplifier, subtracting the averaged dark row value from the exposed row value with a summing amplifier, and amplifying the difference with a programmable gain amplifier. The imaging system utilizes several dark rows for improved quality. Each image pixel value is produced from a combination of a current exposed pixel and a dark current value that is the average of two dark pixels residing in the same column.

The present invention does not limit the number of dark rows that are averaged nor does it restrict the readout mode options. Furthermore, in other embodiments of the present invention, the on-the-fly fixed pattern reduction can be performed with or without on-the-fly color interpolation, with or without sub-sampling, and can be further combined with a window readout mode where only a sub-region of the whole sensor array is utilized.

Another aspect of the present invention relates to an integrated circuit imaging system that offers on-line bad pixel correction process that can be performed in the analog domain and thus provides high speed operation.

DETAILED DESCRIPTION OF THE PREFERRED EMBODIMENTS

The present invention relates to a novel imaging system that provides flexible addressing and processing of imaging pixel sensor elements. The novel architecture of the present invention allows for a highly integrated, low cost imager with high speed performance and good image quality. For example, the imaging system may provide on-the-fly color interpolation, color compensation (also called color correction, color maximization or white balance) and/or fixed pattern noise reduction.

The exemplifying imaging systems described below with reference to FIGS. 1-23 use a CMOS integrated circuit, an array of pixels organized in a rectangle matrix, and a color filter with a primary color system (RGB) in a Bayer color pattern. The imaging systems of the present invention may be implemented with a charge coupled device (CCD) or other imaging technologies. Likewise, the imaging systems of the present invention may be implemented with another color system, such as the complimentary color system (Yellow, Cyan and Magenta) and/or another color pattern. In addition, the imaging system of the present invention may be implemented with the pixels organized in another pixel matrix or pixel topography. For example, the array does not have to be rectangular.

The imaging system may also include either on-chip, as is possible with CMOS integrated circuit imaging devices, or off-chip, as is the case with CCD integrated circuit imaging devices, amplification stages, analog to digital conversion units, memory units and various other signal processing blocks. In addition, the system may further comprise a microlenses layer.

In one embodiment, the color interpolation system, the color compensation system and/or the fixed pattern noise reduction system reside together with the sensor array in the same chip, such as in a CMOS integrated circuit color imaging device. In another embodiment, the color interpolation system, the color compensation system and/or the fixed pattern noise reduction system reside in a separate companion chip, such as in a CCD integrated circuit imaging device.

Figure 1:
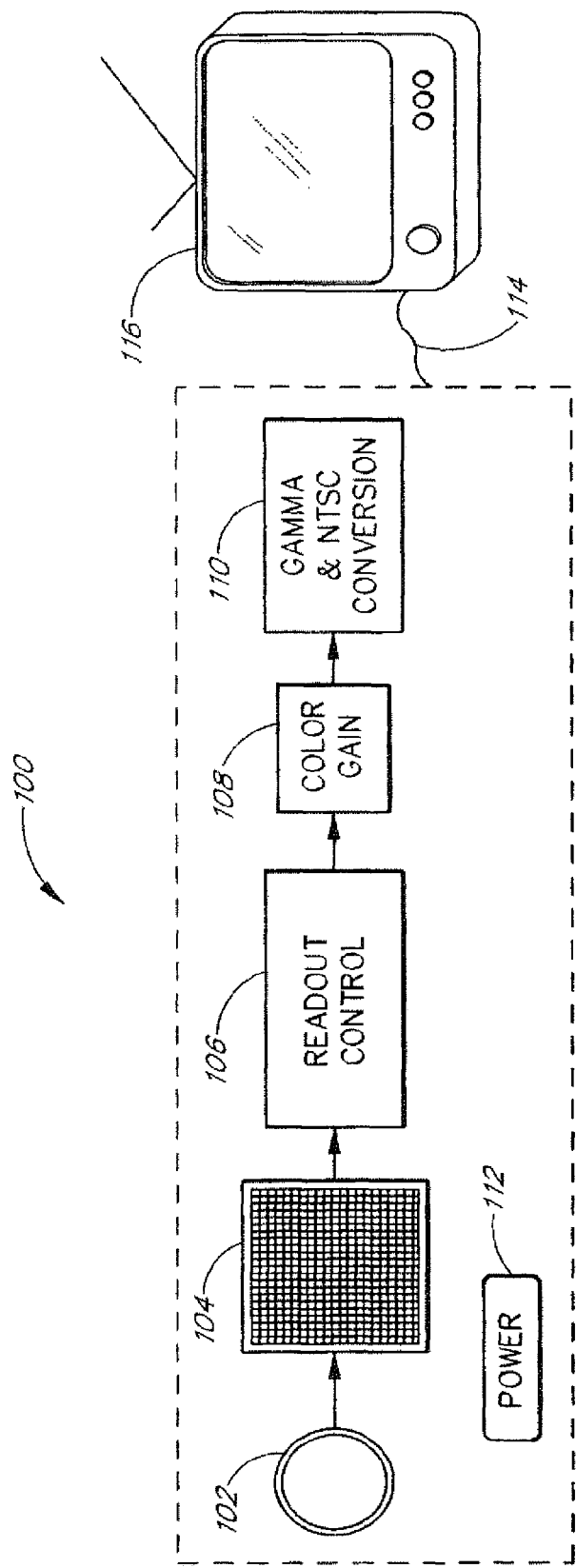
FIG. 1 illustrates one embodiment of an imaging system coupled to a television.
Figure 2:
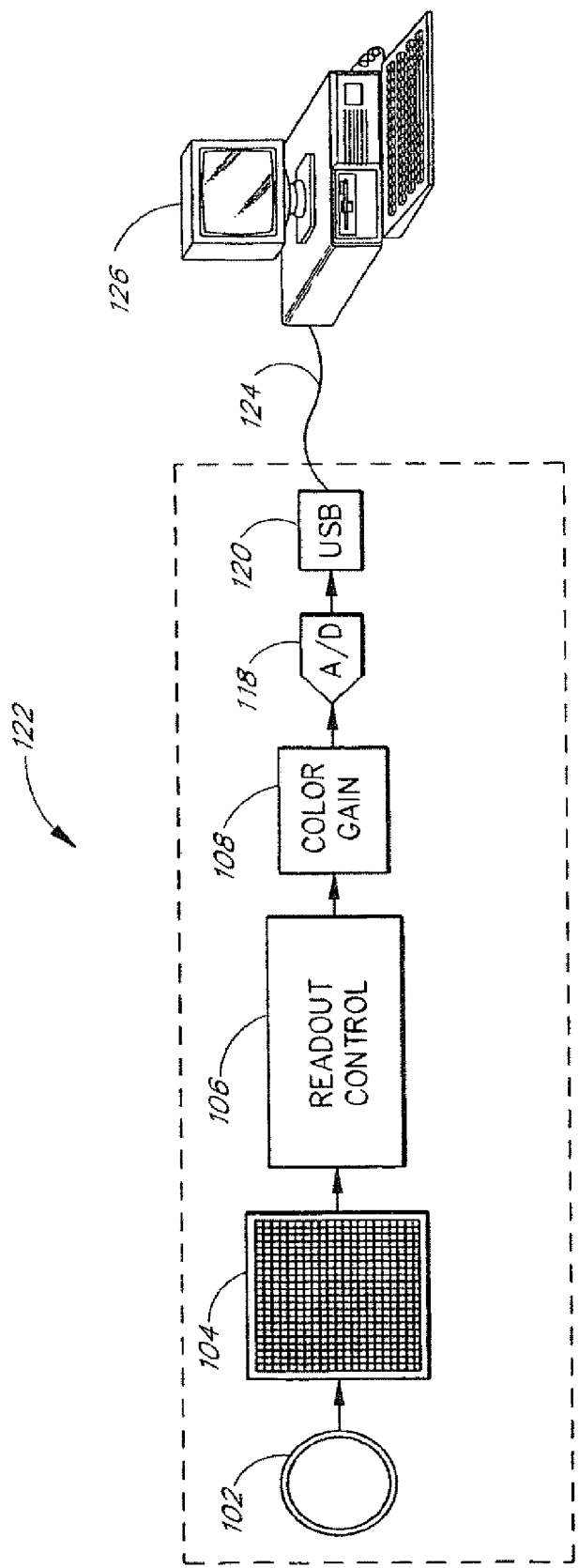
FIG. 2 illustrates one embodiment of an imaging system coupled to a computer.

FIGS. 1 and 2 illustrate exemplifying systems incorporating the novel imaging system 100, 102. The imaging systems 100, 102 will be described in greater detail below with reference to FIGS. 3-23.

FIG. 1 illustrates one embodiment of an imaging system 100 coupled to a television 116 via a coax cable 114. The exemplifying system 100 includes a lens 102, a sensor array 104 which may have color filters, a readout control 106, gain amplifiers 108 for each color, a NTSC encoder 110 including gamma correction and a power supply 112. In one embodiment, the imaging system 100 is a video camera. In other embodiments, the imaging system 100 may be implemented in security cameras, digital cameras, camcorders, video telephones and the like.

FIG. 2 illustrates one embodiment of an imaging system 122 coupled to a computer 126 via a USB cable 124. The exemplifying system 122 includes a lens 102, a sensor array 104 which may have color filters, a readout control 106, gain amplifiers 108 for each color, an analog to digital converter 118, a USB interface 120 and a power supply 112. In one embodiment, the imaging system 122 is a video camera. In other embodiments, the imaging system 122 may be implemented in security cameras, digital cameras, camcorders, video telephones and the like.

Figure 3:
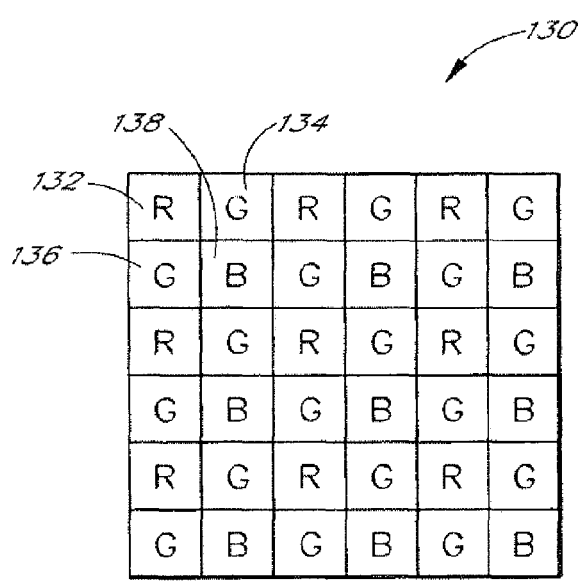
FIG. 3 illustrates a Bayer pattern color filter for the primary color system.

FIG. 3 illustrates a conventional Red, Green and Blue (primary color system) Bayer color pattern 130 for a color filter that is deposited on an array of pixel cells that detect light. The pattern core is a group of 2 by 2 pixels that contains 2 green components 134, 136, one red component 132 and one blue component 138. The 2 green components 134, 136 are diagonal neighbors, and the red and the blue components 132, 138 are diagonal neighbors. Thus, the green resolution of the array is reduced by a ratio of 2:1 horizontally only, while the red and the blue resolution is reduced by a ratio of 2:1 horizontally and vertically. The pattern 130 exploits the fact that the human eye perceives intensity edges better than color edges and that the green component contains the highest amount of intensity information.

On-the-Fly Color Interpolation

As will now be described, an imaging system with a flexible pixel address scheme allows for on-the-fly interpolation of colors based on the outputs of two or more pixels. On-the-fly color interpolation relates to color reconstruction during the sensor readout stage. Color reconstruction relates to reconstructing desired color components for each pixel in order to maintain the original unfiltered array resolution and to compensate for the fact that each filtered pixel is only capable of detecting a single color.

The on-the-fly color interpolation process of the present invention provides high speed of operation and reduced computational complexity with good color image quality. The on-the-fly color interpolation process is advantageously suited for many imaging applications that do not require high color precision or high image quality, as well as those which do. For example, some high quality, digital cameras have modes of operation such as a 'preview' mode where image quality is less important than speed and implementation complexity.

One embodiment of the on-the-fly color interpolation process provides at least two modes of operation: a full resolution mode and a sub-sampling mode. Full resolution mode is preferably used when high image quality is desired. In full resolution mode, each Red-Green-Blue (RGB) triplet needed for a color pixel representation is produced from a group of 2×2 pixels within the Bayer pattern. The four pixels are read out simultaneously, the two diagonally neighboring Green pixels are summed together, and the gain associated with the Green pixels is reduced in half. The resulting Green component is sent out with the diagonally neighboring Red and Blue pixels to produce one RGB triplet. Each subsequent RGB triplet shares one of the Green pixels and either the Red or Blue pixel of the preceding RGB triplet.

Sub-sampling mode is preferably used when a lower resolution image is desired, such as a preview feature. Sub-sampling is achieved via skipping pixels along the horizontal and/or the vertical axis of the pixel array. For a sub-sampling ratio of 1:j vertically and 1:k horizontally, where j, k are even, each RGB triplet that is needed for a color pixel representation is produced from a group of j by k pixels with the Bayer pattern. All Green pixels in the j*k neighborhood are averaged to produce the green component. Similarly, all of the Red pixels in the same neighborhood are averaged to produce the Red component, and all Blue pixels in the neighborhood are averaged to produce the Blue component. The three components are then sent out as the RGB triplet representing the j by k group of pixels. The sub-sampling process can be achieved by reading the j rows in parallel or in series.

Both the full resolution and the sub-sampling modes of operation can be further combined with a window readout mode (also called "window mode" or "windowing"). In window mode, a sub-region of the whole pixel sensor array is readout and processed. Thus, a window mode is essentially a cropping operation that produces a smaller area of interest. Window readout mode is faster and provides a higher frame rate. Window mode may be used in digital cameras for exposure and focus calculations, for electronic zoom and more. Window mode is described in greater detail below with reference to FIG. 10.

Figure 4:
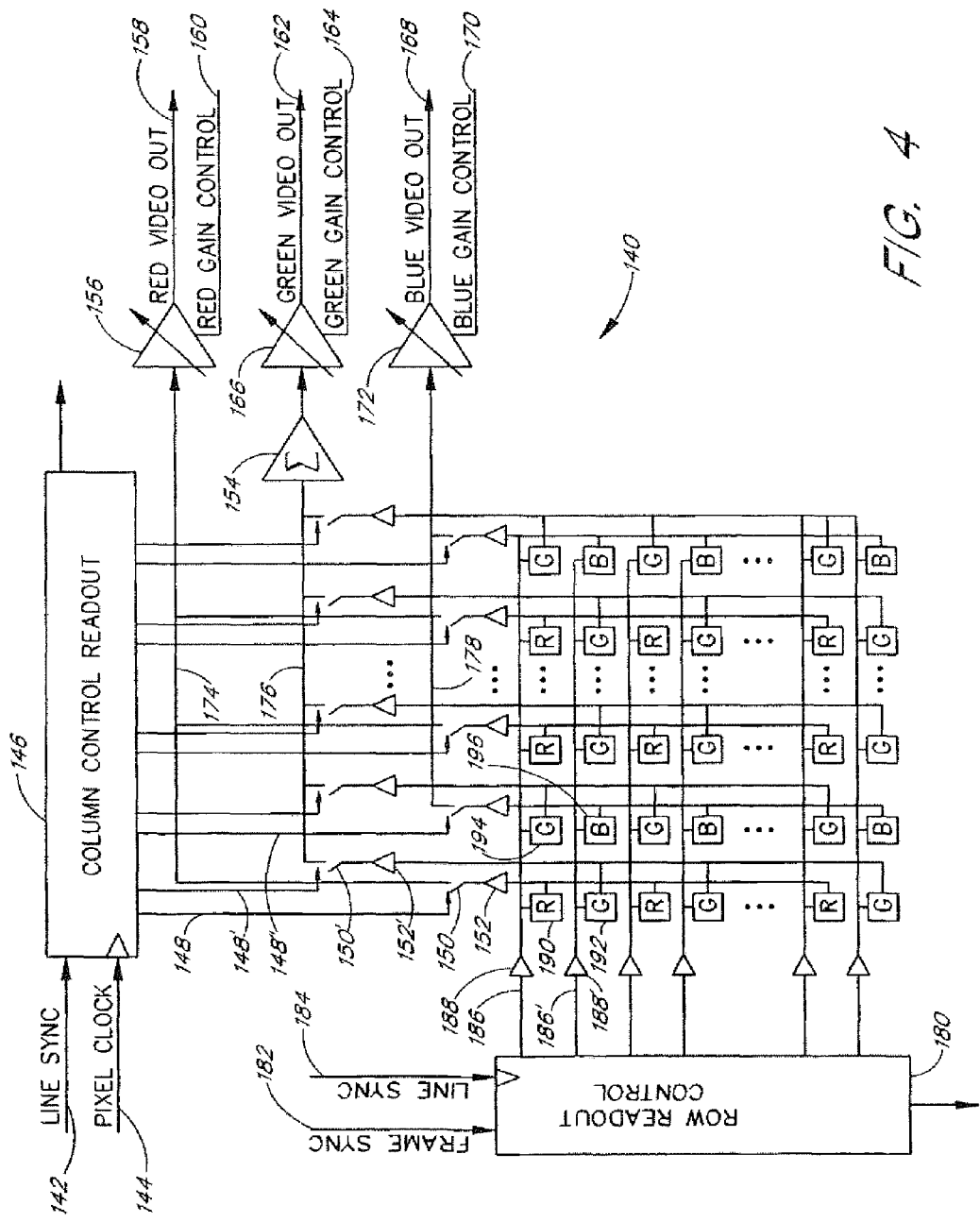
FIG. 4 illustrates one embodiment of a CMOS integrated circuit color imaging system that supports on-the-fly color interpolation.

FIG. 4 illustrates one embodiment of a novel CMOS integrated circuit color imaging system 140 that supports on-the-fly color interpolation using analog signals. The system 140 uses the Bay color pattern illustrated in FIG. 3. As illustrated in FIG. 4, the system 140 includes a column readout control circuit 146, a line synchronization signal 142, a pixel clock 144, a first column readout line 148, a second column readout line 148', a third column readout line 148", a first switch 150, a first column buffer 152, a second switch 150', a second column buffer 152', an analog summing amplifier 154, a programmable analog red gain amplifier 156, a red video out line 158, a red gain control line 160, a green video out line 162, a green gain control line 164, a programmable analog green gain amplifier 166, a blue video out line 168, a blue gain control line 170, a programmable analog blue gain amplifier 172, a red output path 174, a green output path 176, a blue output path 178, a row readout control circuit 180, a frame synchronization line 182, a line synchronization line 184, a first row readout line 186, a second row readout line 186', a first row buffer 188, a second row buffer 188', a first red pixel 190, a first green pixel 192, a second green pixel 194 and a first blue pixel 196.

In the description herein, a "programmable" component refers to a component that responds to a command from an end-user of the imaging system or to a command issued by internal firmware according to firmware stored in the imaging system. For example, if an end-user chooses a 'zoom' function or a 'preview' function on a video camera containing the imaging system of the present invention, the imaging system directs the programmable components to act in a predefined manner according to firmware stored in the imaging system.

The imaging system of the present invention does not need the color gain amplifiers 156, 166, 172 (FIG. 4) to be implemented as a separate stage. In one embodiment, a plurality of color gain amplifiers are contained within the pixel circuitry of the sensor array. In another embodiment, a plurality of color gain amplifiers are within the column buffers 152, 152'.

As will now be described, the system 140 accommodates on-the-fly color interpolation via a programmable pixel readout mode. The exemplifying system 140 implements an RGB Bayer color pattern on-the-fly color interpolation when windowing and sub-sampling are not active. The system 140 is not limited in its mode of operation and can support windowing and sub-sampling via the programmable readout control circuitry 146, 180, the summing amplifier(s) 154 and the programmable gain amplifiers 156, 166, 172.

Figure 5:
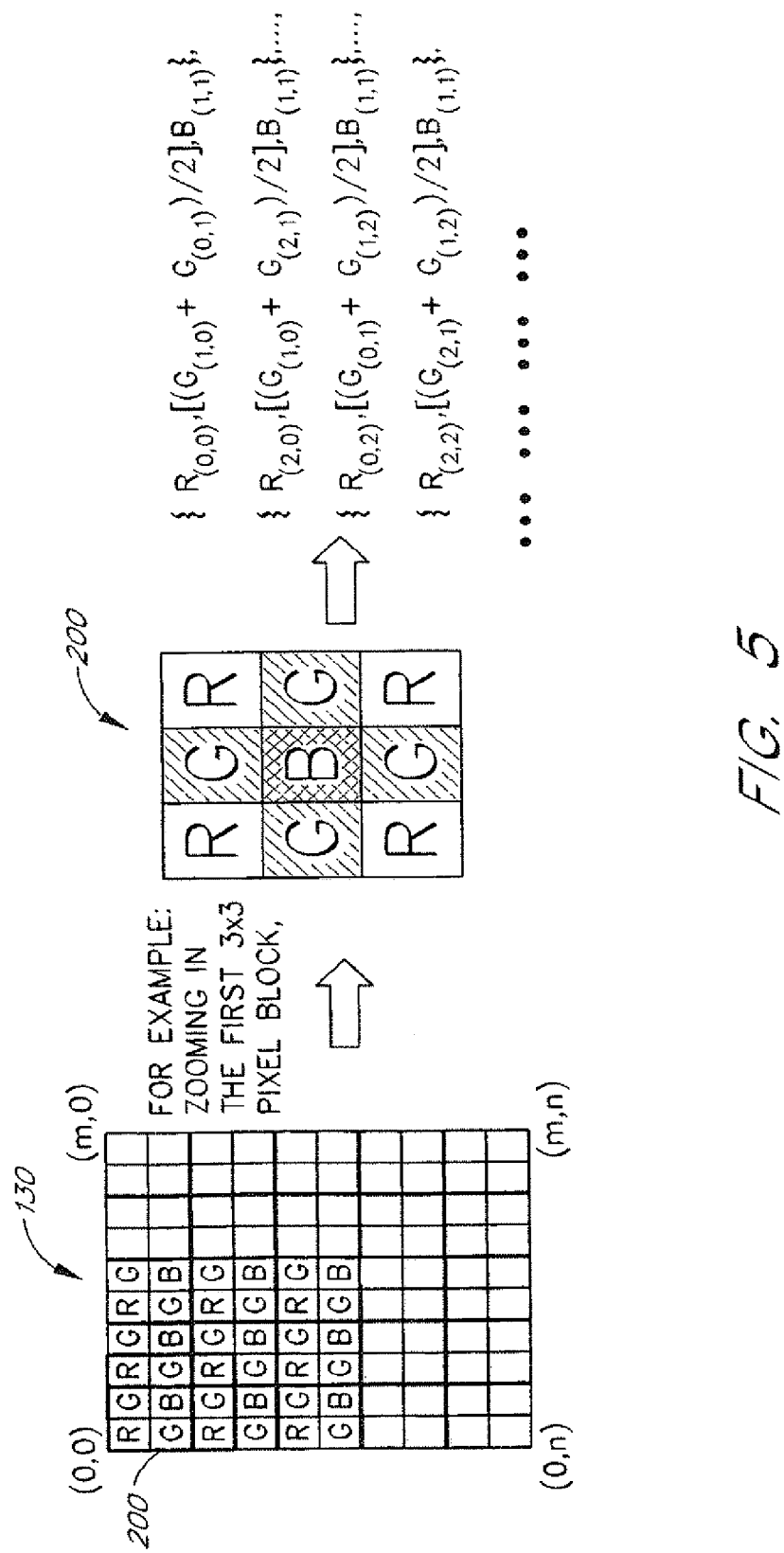
FIG. 5 illustrates one embodiment of a readout sequence for the system of FIG. 4 with on-the-fly color interpolation in a full resolution mode.

FIG. 5 illustrates one embodiment of a pixel readout sequence for the system 140 of FIG. 4 with on-the-fly color interpolation in a full resolution mode. The sequence accommodates an RGB Bayer pattern color filter 130 (FIG. 3) in a non-window mode and without sub-sampling. Each RGB triplet that is needed for a color pixel representation is produced from a group of 2×2 pixels that contains the Bayer pattern core. For example, while reading four pixels substantially simultaneously, the two diagonally neighboring Green pixels 192, 194 are averaged and sent out with the neighboring Red and Blue pixels 190, 196 to produce a RGB triplet. Three other subsequent RGB triplet shares one of the Green pixels 192, 194 and either the Red or the Blue pixels 190, 196 with the previous RGB triplet. For example, in FIG. 5, four RGB triplets are formed from a 3×3 pixel block 200:

{R(0,0), [(G(1,0)+G(0,1))/2], B(1,1)}
{R(2,0), [(G(1,0)+G(2,1))/2], B(1,1)}
{R(0,2), [(G(0,1)+G(1,2))/2], B(1,1)}
{R(2,2), [(G(2,1)+G(1,2))/2], B(1,1)} where the first numeral in the parenthesis represents the row and the second numeral represents the column.

Similar readout sequences can be devised in accordance with the present invention for color filter patterns other than Bayer and for color systems other than the primary one.

Figure 6:
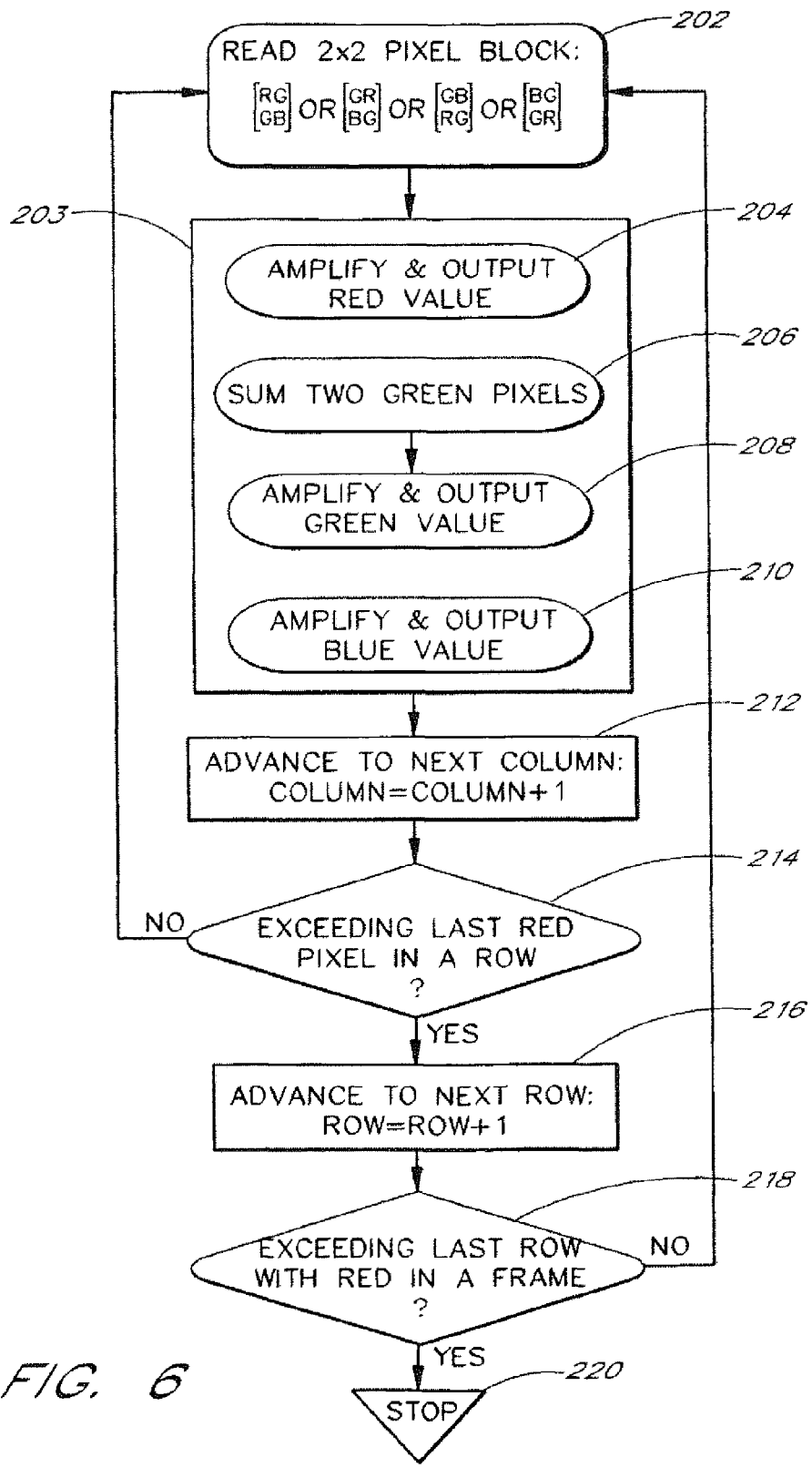
FIG. 6 illustrates one embodiment of the on-the-fly color interpolation process in a full resolution mode.

FIG. 6 illustrates one embodiment of the on-the-fly color interpolation process in a full resolution mode. In a process block 202, the illustrated system 140 may simultaneously read out a group of 2 by 2 pixels that contains the Bayer pattern core. In a process block 203, the system 140 may perform several acts substantially simultaneously (in parallel). In blocks 204, 210, the system 140 reads the corresponding red and the blue components 190, 196 that reside in two consecutive columns 148, 148" (FIG. 4) and amplifies accordingly via the programmable red and blue gain amplifiers 156, 172. In blocks 206-208, the system 140 reads the two green components 192, 194 that reside in two consecutive columns 148, 148" and sums the values with the summing amplifier 154. The gain from the summing amplifier 154 is adjusted accordingly via the programmable gain amplifier 166. The programmable readout control 146, 180 ensures that the appropriate switches are closed to allow the correct readout sequence as described in FIG. 5.

In FIG. 6, the acts in block 203 (amplifying and outputting a red value, amplifying and outputting a green value and amplifying and outputting a blue value) are performed substantially simultaneously. In another embodiment, the acts of block 203 are performed in a sequence, e.g. the system 140 amplifies and outputs a red value, then amplifies and outputs a green value, and then amplifies and outputs a blue value.

In FIG. 6, the system 140 advances to the next column in a block 212, new COLUMN=old COLUMN+1. In a block 214, the system 140 determines whether the column readout control 146 is exceeding the last Red pixel in a row. If yes, then the process proceeds to a block 216, and the row readout control 180 advances to the next row, new ROW=old ROW+1. If not, then the process loops back to block 202. In a block 218, the system determines whether the row readout control 180 is exceeding the last Red pixel in a frame. If yes, then the process stops in a stop block 220 and waits for further commands. If not, then the process proceeds to block 202.

Figure 7:
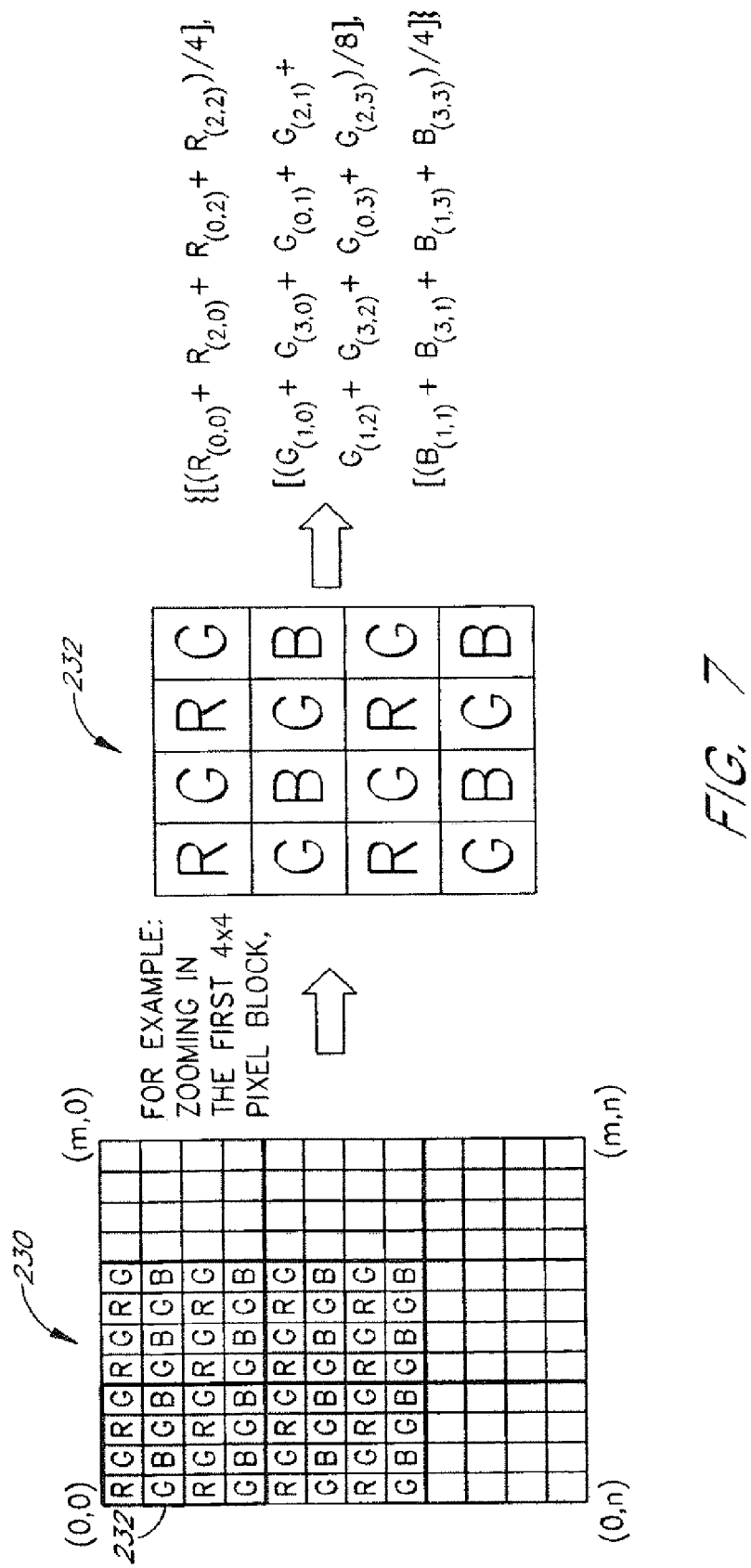
FIG. 7 illustrates one embodiment of a readout sequence for on-the-fly color interpolation in a sub-sampling mode.

FIG. 7 illustrates one embodiment of a readout sequence for on-the-fly color interpolation in a sub-sampling mode. In FIG. 7, the sequence accommodates an RGB Bayer pattern color filter 230 in a non-window mode with sub-sampling. In FIG. 7, the sub-sampling ratio is 1:4 horizontally and 1:4 vertically. Each RGB triplet that is needed for a color pixel representation is produced from a group 232 of 4×4 pixels that contains 4 Bayer pattern cores. The 8 green pixels are averaged to produce the green component, the 4 red pixels are averaged to produce the red component, and the 4 blue pixels are averaged to produce the blue component. Specifically, as illustrated in FIG. 7, the red component comprises

[(R(0,0)+R(2,0)+R(0,2)+R(2,2))/4], the green component comprises

[(G(1,0)+G(3,0)+G(0,1)+G(2,1)+G(1,2)+G(3,2)+G(0,3)+
G(2,3))/8], and the blue component comprises

[(B(1,1)+B(3,1)+B(1,3)+B(3,3))/4]

Similar readout sequences can be devised for color filter patterns other than Bayer and for color systems other than the primary one.

Figure 8:
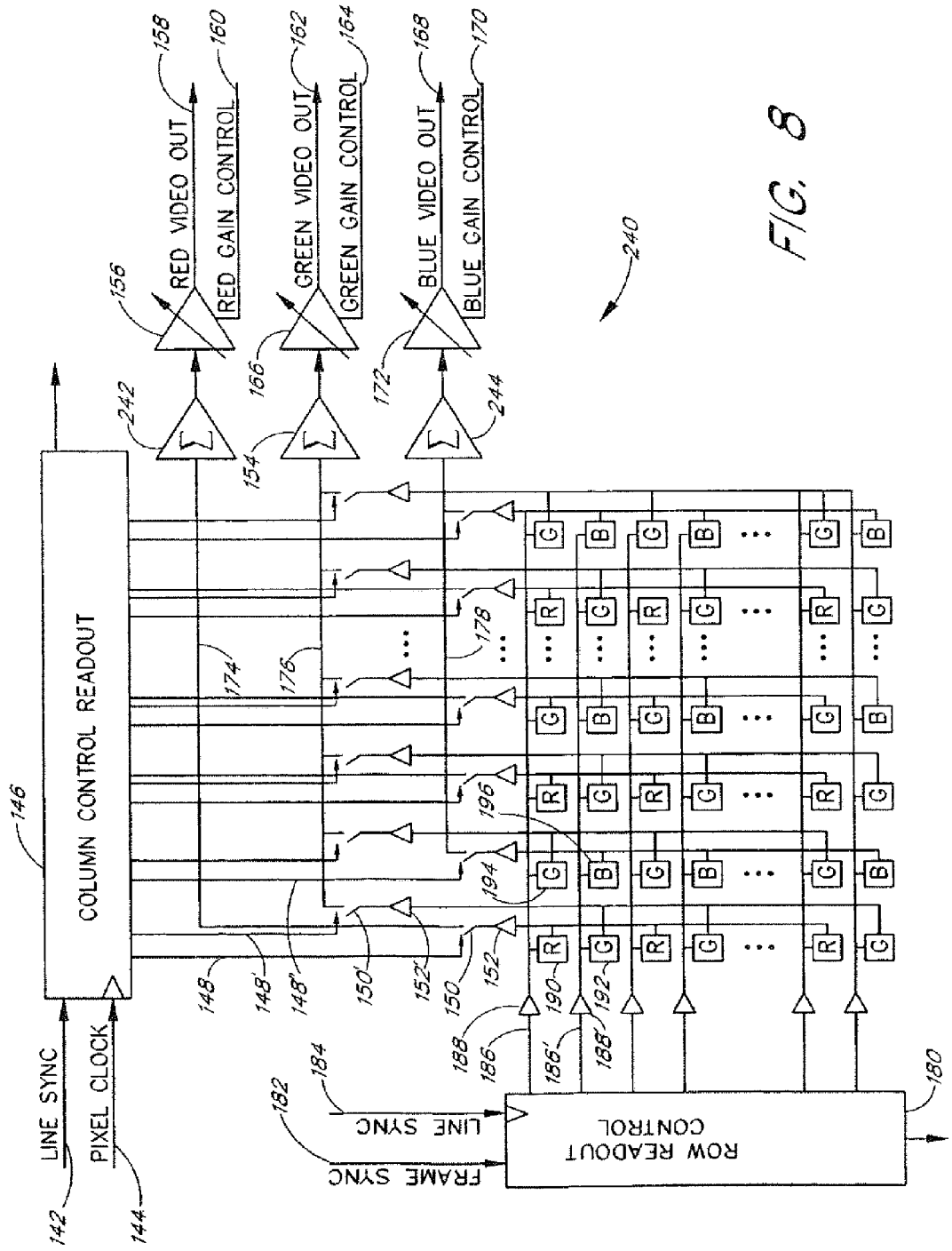
FIG. 8 illustrates one embodiment of a CMOS integrated circuit color imaging system that supports on-the-fly color interpolation in a sub-sampling mode.

FIG. 8 illustrates one embodiment of a CMOS integrated circuit color imaging system 240 that supports on-the-fly color interpolation in a programmable pixel readout mode, such as a sub-sampling mode. The structure of the system 240 is substantially similar to the system 140 of FIG. 4, except that the system 240 also includes a red summing amplifier 242 and a blue summing amplifier 244. The function of these additional amplifiers is described below. FIG. 8 presents an implementation for an RGB Bayer pattern on-the-fly color interpolation where windowing is not active and sub-sampling is active. However, the system 240 is not limited to a Bayer pattern and/or the primary color scheme. Nor is the system 240 limited in its mode of operation. The system 240 can be realized to support both window and sub-sampling via the programmable readout control circuitry 146, 180, the summing amplifier(s) 242, 154, 244, and the programmable gain amplifiers 156, 166, 172.

Figure 9:
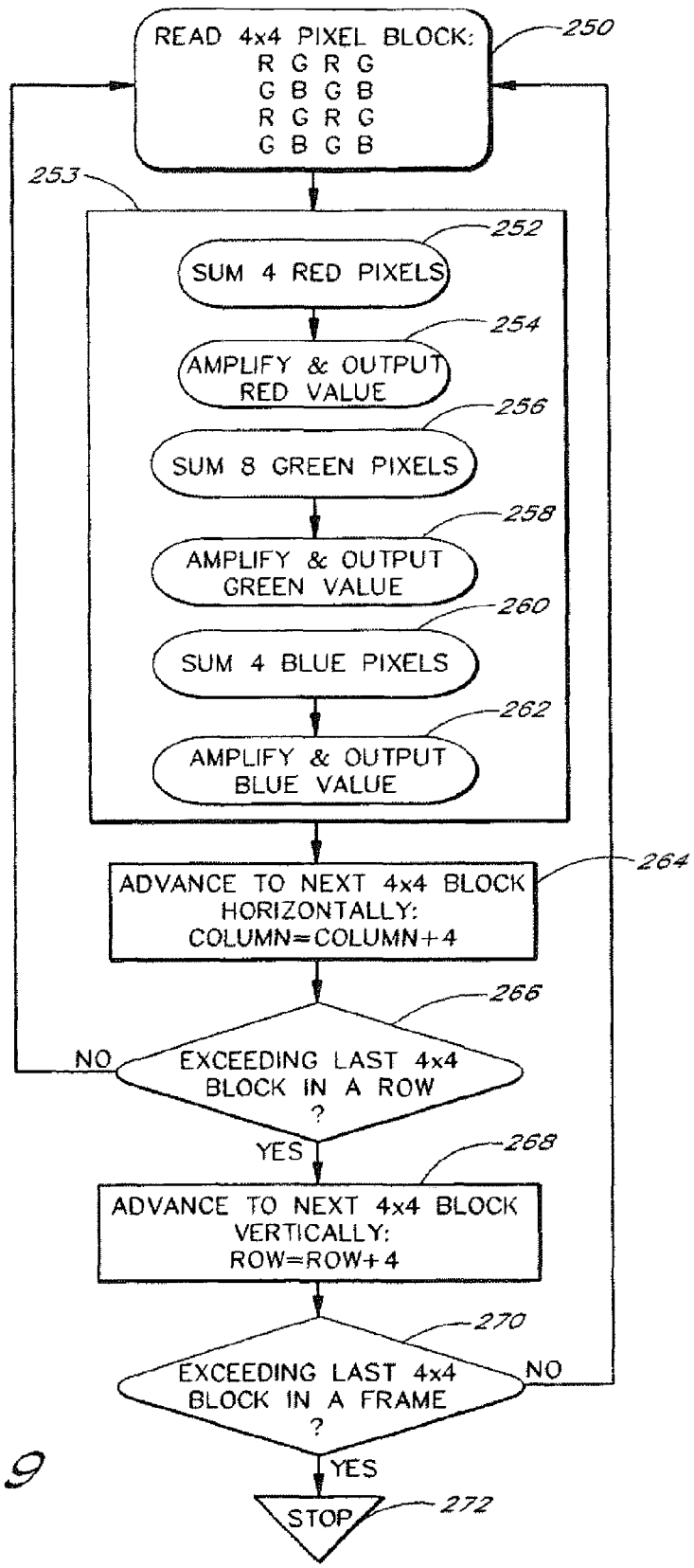
FIG. 9 illustrates one embodiment of the on-the-fly color interpolation process in a sub-sampling mode.

FIG. 9 illustrates one embodiment of the on-the-fly color interpolation process in a sub-sampling mode, as described with reference to FIGS. 7 and 8. FIG. 9 illustrates sub-sampling a RGB Bayer color filter 230 (FIG. 7) using a ratio of 4:1 horizontally and 4:1 vertically. In a block 250, a group 232 (FIG. 7) of 4 by 4 pixels that contains Bayer pattern cores is read out simultaneously.

In a process block 253, the system 240 may perform several acts substantially simultaneously (in parallel). In blocks 252, 254, the four red pixels shown in sub-sample 232 of FIG. 7 are summed and amplified by the red amplifiers 242, 156 of FIG. 8. In blocks 256, 258, the 8 green pixels that reside in four consecutive columns (FIG. 7) are summed via the green summing amplifier 154 and amplified by the green amplifier 166 (FIG. 8). In blocks 260, 262, the four blue pixels shown in sub-sample 232 of FIG. 7 are summed and amplified by the blue amplifiers 244, 172 of FIG. 8. The programmable readout control 146, 180 of FIG. 8 ensures that the appropriate switches are closed to allow the correct readout sequence as described in FIGS. 7 and 9.

In FIG. 9, the acts in block 253 are performed substantially simultaneously. In another embodiment, the acts of block 253 are performed in a sequence, e.g. the system 240 sums, amplifies and outputs a red value, then sums, amplifies and outputs a green value, and then sums, amplifies and outputs a blue value.

In FIG. 9, the system 240 advances to the next 4×4 block horizontally in a block 264, new COLUMN=old COLUMN+4. In a block 266, the system 240 determines whether the column readout control 146 is exceeding the last 4×4 block in a row. If yes, then the process proceeds to a block 268, and the system 240 advances vertically to the next 4×4 block, new ROW=old ROW+4. If not, then the process loops back to block 250. In a block 270, the system 240 determines whether the row readout control 180 is exceeding the last 4×4 block in a frame. If yes, then the process stops in a stop block 272 and waits for further commands. If not, then the process proceeds to block 250.

Figure 10:
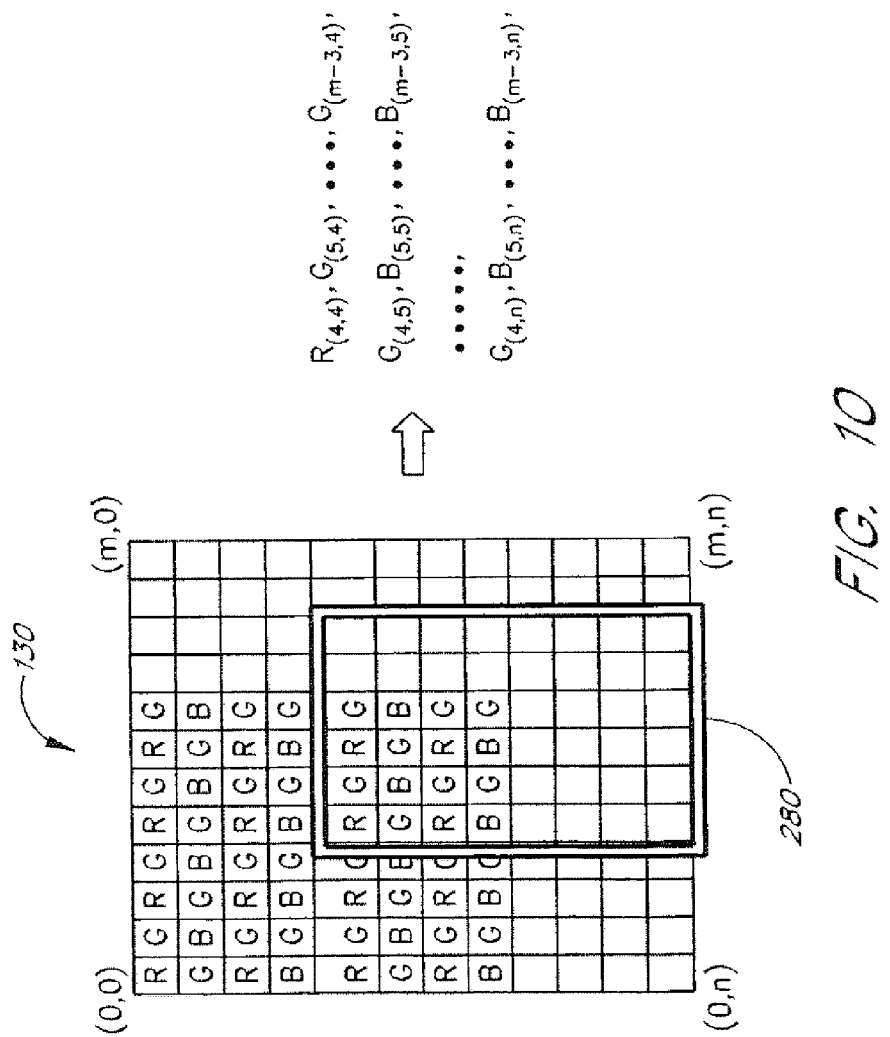
FIG. 10 illustrates a one embodiment of window mode.

FIG. 10 illustrates a one embodiment of window readout mode. For simplicity, sub-sampling and/or on-the-fly color interpolation are not included in the embodiment shown in FIG. 10. In window mode, a sub-region 280 of the pixel array exposed area 130 is readout. In the embodiment shown in FIG. 10, the pixel array exposed area size is n by m, the window size is chosen to be n−4 by m−6, and the window origin is chosen to be (4,4). Thus, the sub-region 280 comprises pixels in a rectangle defined by four pixels R(4,4), G(m−3,4), G(4,n) and B(m−3,n) at the four corners.

A window mode is essentially a cropping operation that produces a smaller area of interest. The readout is faster and provides a higher frame rate than the system 240 of FIG. 8. The system 240 of FIG. 8 may be modified to support window readout mode. Window mode may be used in digital cameras for exposure and focus calculations, for electronic zoom and more.

Figure 11:
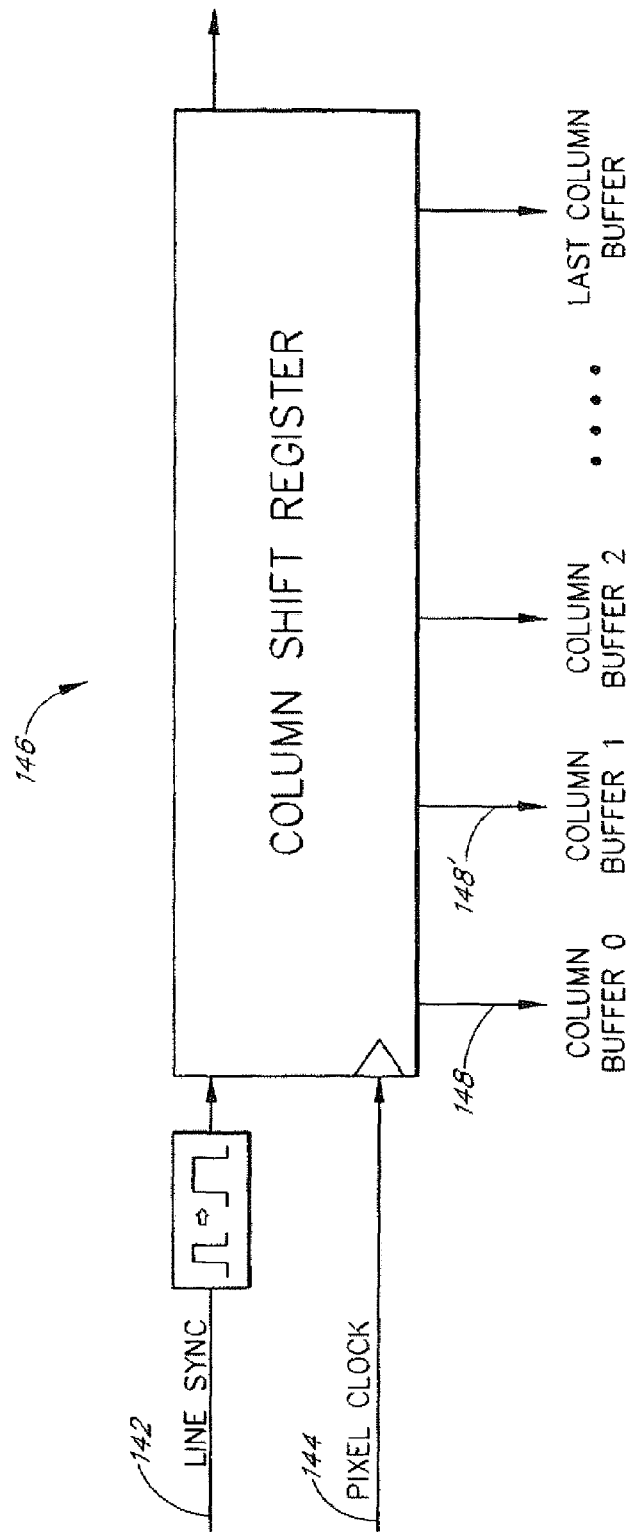
FIG. 11 illustrates one embodiment of a readout control that supports on-the-fly color interpolation in a full resolution mode as shown in FIG. 5.

FIG. 11 illustrates one embodiment of a column readout control 146 (FIG. 4) that supports on-the-fly color interpolation in a full resolution mode as illustrated in FIG. 5. The readout control of the system 146 advantageously allows the simultaneous readout of a 2×2 pixel block. The readout control comprises a column readout control 146 that provides simultaneous readout of two columns and a row readout control 180 that provides a simultaneous readout of two rows.

The column readout control 146 includes a shift register that is responsible for closing the switches of the column buffers two at a time. The pixel clock 144 clocks the shift register 146. The line sync signal 142 is feeding the shift register 146 and is multiplied by two to allow signal width of two consecutive bits. Thus, the shift register 146 closes two consecutive column buffer switches coupled to lines 148, 148' simultaneously.

The row readout control 180 (FIG. 4) is substantially similar except the shift register clock of the row readout control 180 utilizes a line sync 184 instead of the pixel clock, and the shift register input data utilizes a frame sync 182 instead of the line sync signal.

Figure 12:
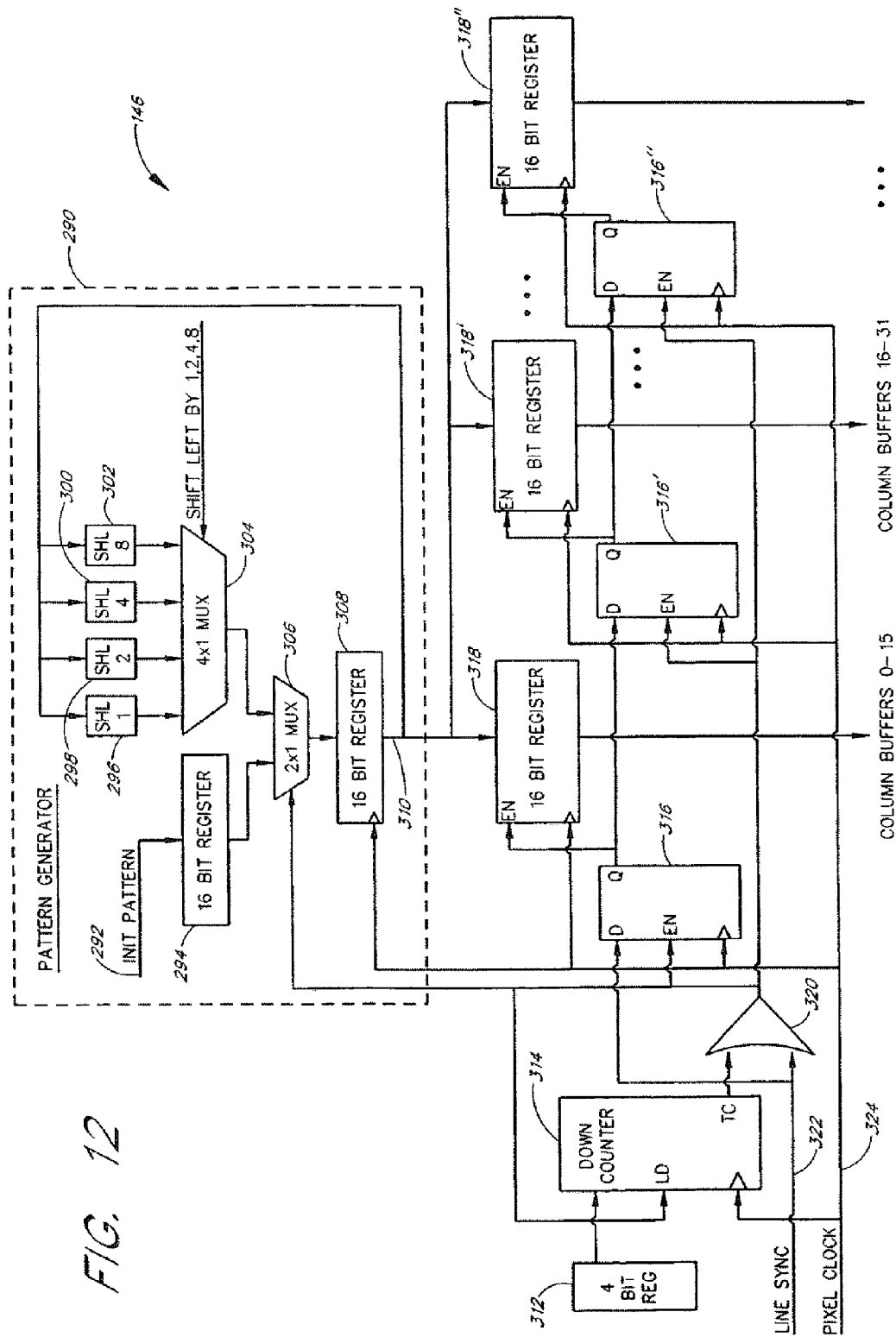
FIG. 12 illustrates one embodiment of a readout control that supports on-the-fly color interpolation in sub-sampling mode shown in FIG. 8, as well as the full resolution mode shown in FIG. 5.

FIG. 12 illustrates one embodiment of a novel readout control that supports on-the-fly color interpolation in sub-sampling mode shown in FIG. 8, as well as the full resolution mode shown in FIG. 5. FIG. 12 demonstrates the column readout control 146. The sub-sampling modes chosen for the example are: 1:2, 1:4, 1:8 and 1:16. The readout control of FIG. 12 also supports overlap such as the case in the full resolution mode (FIG. 5). The shift register that is responsible for closing the column buffer switches is divided into 16-bit registers 318, 318', 318'' that are clocked by the pixel clock 324.

In FIG. 12, each register 318 is loaded with a bit pattern that is produced by the pattern generator 290. In a full resolution mode, the pattern generator 290 shifts a pattern 292 (provided by the initial pattern signal line) left by 1 during each cycle and causes an overlap. For a sub-sampling ratio of 1:4, "1111" is the pattern 292 provided on an initial pattern line and loaded since four columns are read simultaneously. In each cycle, the pattern is shifted left and selected by the multiplexors 304, 308. For example, a shift amount of 4 is used for sub-sampling 1:4 without overlap. The down counter 314 is responsible for counting pixel clocks for each 16-bit register 318, e.g. for sub-sampling of 1:4 without overlap, the counter 314 counts 4 times from the line sync 322. Then the counter 314 is reloaded by the register 312, and the next 16-bit register 318' is enabled by the latch 316 and the initial pattern is reloaded by the 16-bit register 308.

The row readout control 180 is similar to the column readout control 146 shown in FIG. 12 except the clock 324 utilizes a line sync 184 instead of the pixel clock, and the initializing signal 322 utilizes a frame sync 182 instead of the line sync signal.

Color Compensation

As previously discussed, another aspect of the invention relates to color compensation (correction or maximization). The color compensation process compensates for differences in the response of various color filters and variations within the integrated circuit sensor array, such as process, materials, temperature or manufacturing. The color compensation process of the present invention improves color dynamic range, decreases computations and hardware and improves speed of operation. The color compensation process of the present invention is advantageously performed in the analog domain before an analog-to-digital conversion.

Figure 13:
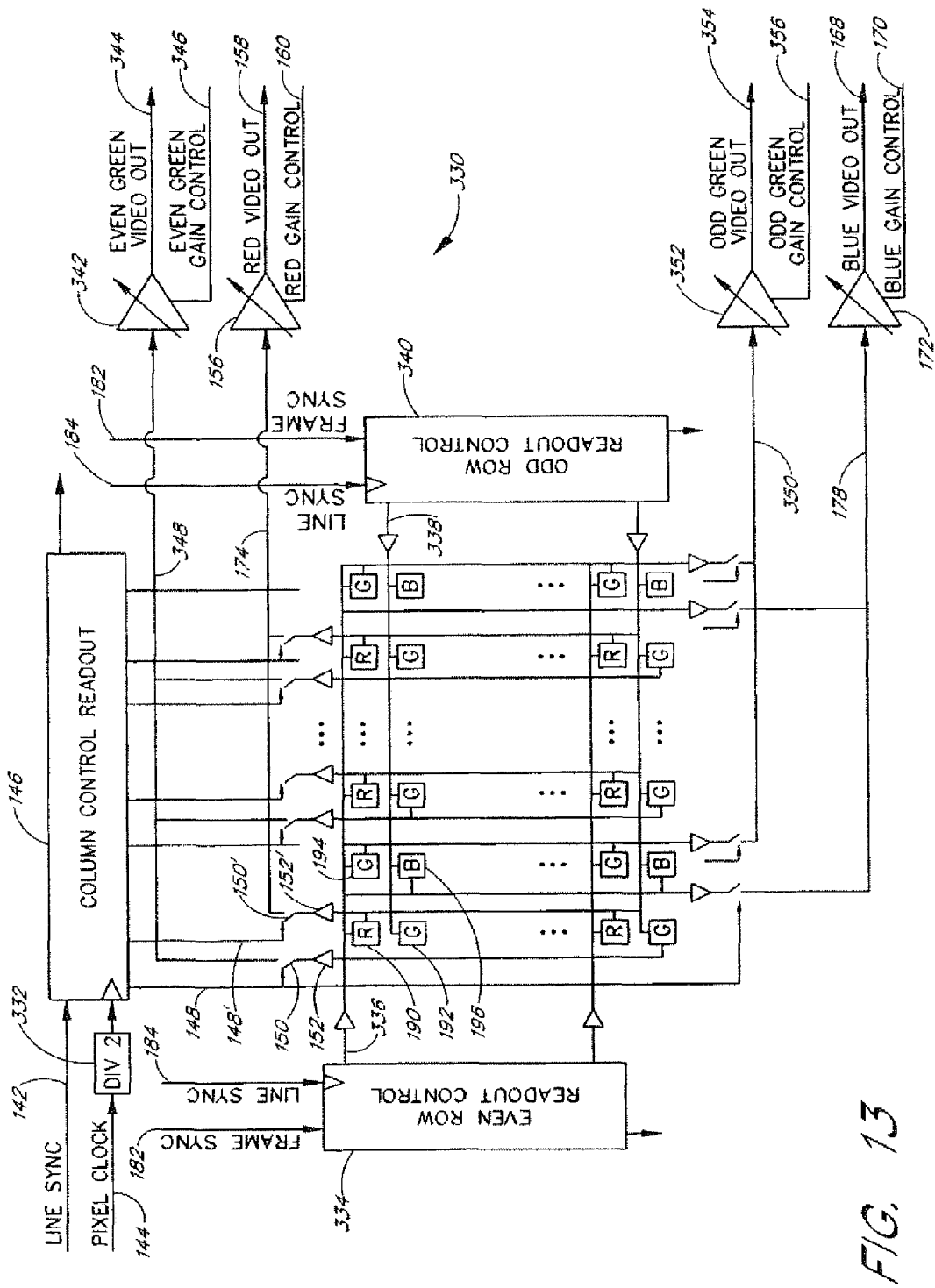
FIG. 13 illustrates one embodiment of a CMOS integrated circuit color imaging system with color correction.

FIG. 13 illustrates one embodiment of a CMOS integrated circuit color imaging system 330 of the present invention with analog color correction. The system 330 provides a programmable pixel readout mode that allows four independent readouts and four programmable gain amplifiers 156, 172, 342, 352 for amplifying the four output paths (red, blue, even green, odd green) separately. FIG. 13 presents an implementation for an RGB Bayer pattern. However, the system 330 is not limited to a Bayer pattern and/or the primary color scheme. In FIG. 13, the system 330 employs readout control circuitry 146, 334 with separate paths for even and odd rows and columns 174, 178, 348, 350, and programmable gain amplifiers 156, 172, 342, 352. Thus, the system 330 provides four separate, simultaneous output paths with potentially different amplified gains.

Figure 17:
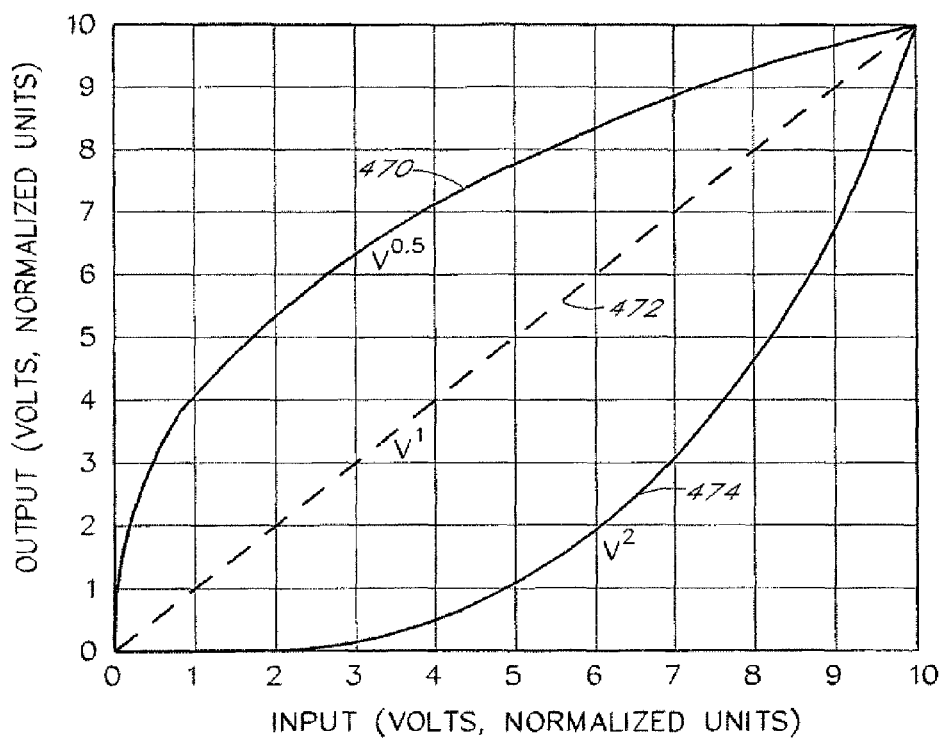
FIG. 17 presents embodiments of optional transfer function for the programmable gain amplifiers.

The system 330 is not restricted to a particular type of transfer function with respect to the programmable gain amplifiers 156, 172, 342, 352. In one embodiment, each of the four programmable gain amplifiers 156, 172, 342, 352 implement different transfer functions, such as a log or an exponent function where the power value is programmable, as shown in FIG. 17. Thus, the different transfer functions advantageously allow different levels of color compensation for different colors. In one embodiment, the transfer functions may be modified in real-time according to the level of compensation needed to accommodate temperature, differences in the response of various color filters and variations within the integrated circuit sensor array, such as process, materials or manufacturing. In another embodiment, the transfer functions may be pre-set at the manufacturer to accommodate variations within the integrated circuit sensor array, such as process, materials or manufacturing.

Figure 14:
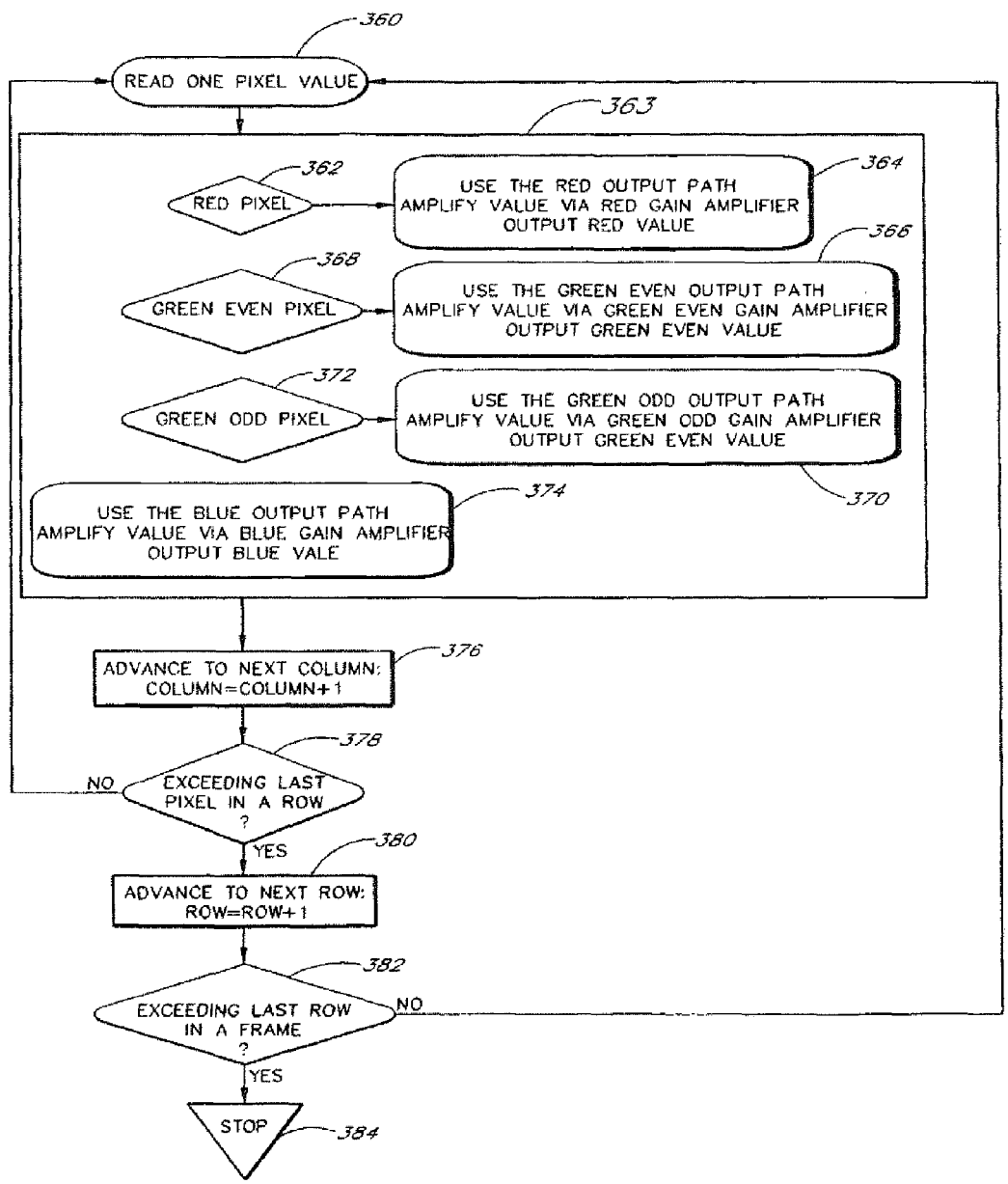
FIG. 14 provides one embodiment of a process for color correction.

FIG. 14 provides one embodiment for the analog color correction process performed by the system 330 of FIG. 13. In a block 360, the system 330 (FIG. 13) reads a pixel value. In a block 363, the system 330 may perform several acts simultaneously (in parallel). Blocks 362, 368 and 372 determine the color of the pixel value. In a block 364, the red pixel 190 that resides in an even column and even row is amplified via the red programmable amplifier 156. In a block 366, the green pixel 192 that resides in an even column and odd row is amplified via the even green programmable amplifier 342. In a block 370, the green pixel 194 that resides in an odd column and even row 194 is amplified via the odd green amplifier 352. In a block 374, the blue pixel 196 that resides in an odd column and odd row is amplified via the blue programmable amplifier 172. The acts in block 363 are performed substantially simultaneously. In another embodiment, the acts of block 363 are performed in a sequence.

In a block 376, the system 330 advances to the next column, new COLUMN=old COLUMN+1. In a block 378, the system 330 determines whether the system readout is exceeding the last pixel in a row. If not, the system 330 returns to process block 360. If yes, the system 330 advances to the next row, new ROW=old ROW+1, in a block 380. In a block 382, the system 330 determines whether the system readout is exceeding the last row in a frame. If not, the system 330 returns to process block 360. If yes, the system 330 stops in a stop block 384 and waits for further commands.

In addition to the significant innovations described above, one embodiment of the color compensation process of the present invention also improves white balancing, which is used to compensate colors for different illumination temperatures.

Figure 15:
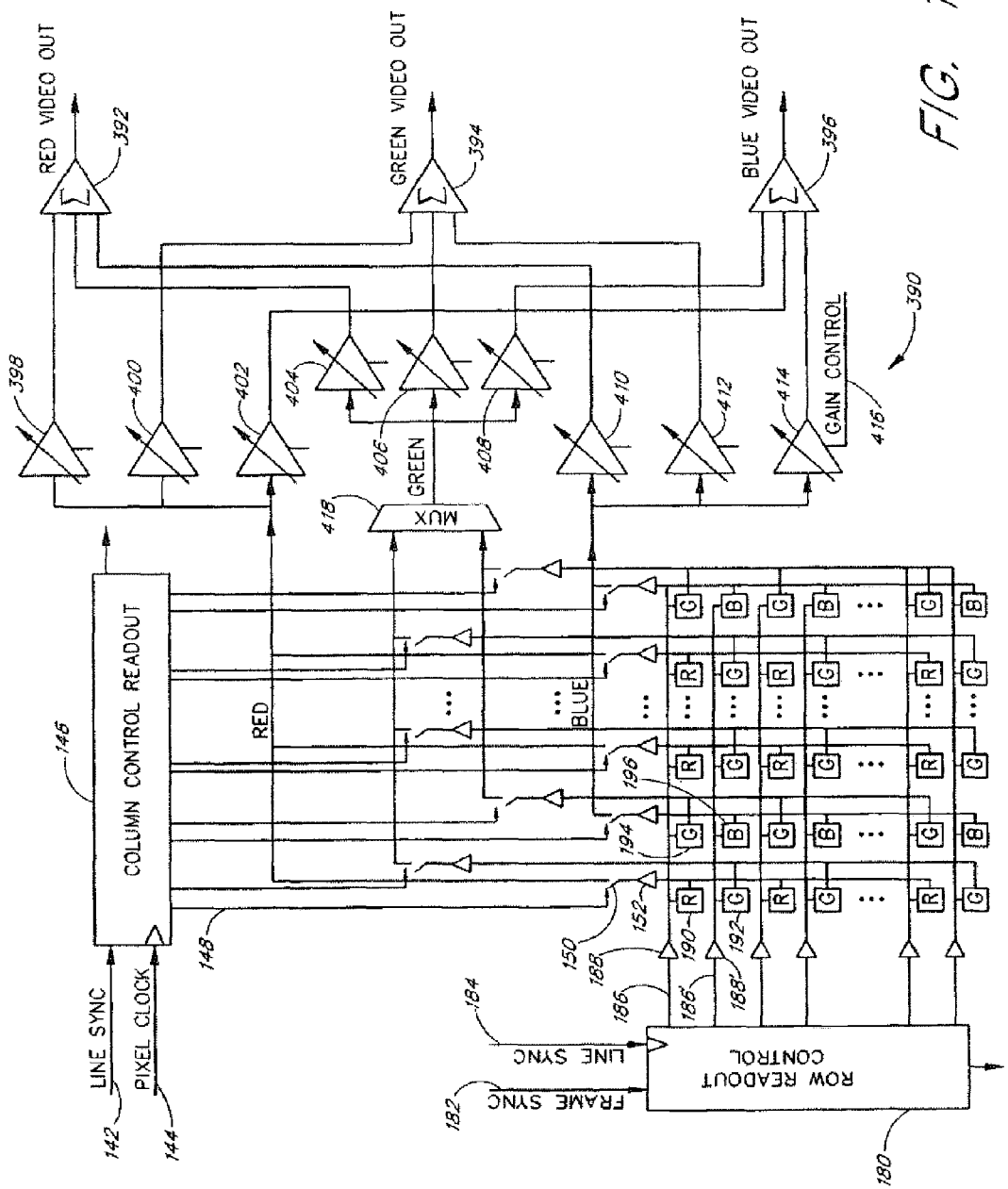
FIG. 15 illustrates one embodiment of a CMOS integrated circuit color imaging system with white balance.

FIG. 15 illustrates one embodiment of a CMOS integrated circuit color imaging system 390 that accommodates analog white balance with programmable pixel readout modes, multiplexor(s) 418, programmable gain amplifiers 398-414, and summing amplifiers 392, 394 and 396. FIG. 15 presents an implementation for an RGB Bayer pattern. However, the system 390 is not limited to a Bayer pattern and/or the primary color scheme. In FIG. 15, the system 390 employs readout control circuitry 146, 180 with separate paths for even and odd rows 186 and columns 148, a multiplexor 418 for selecting the appropriate green path, programmable gain amplifiers 398-414, and summing amplifiers 392, 394 and 396. The multiple amplifier gain stages provide convolutions associated with white balance.

Figure 16:
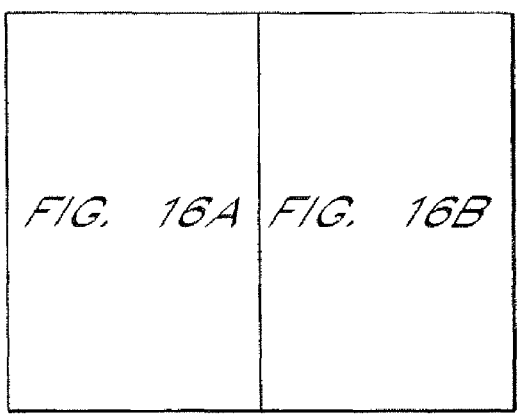
FIGS. 16, 16A and 16B provide one embodiment of a process for white balance.
Figure 16A:
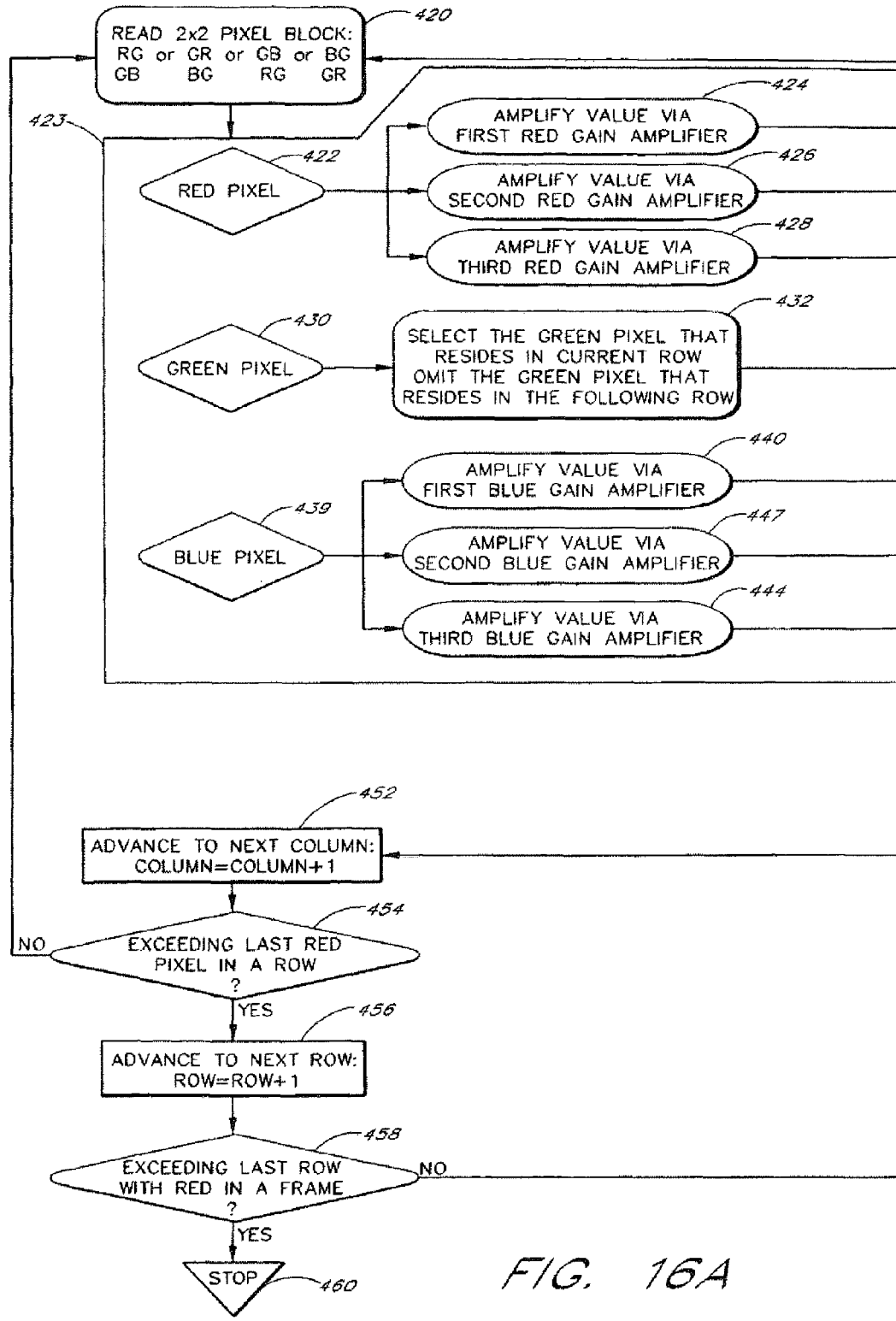
Figure 16B:
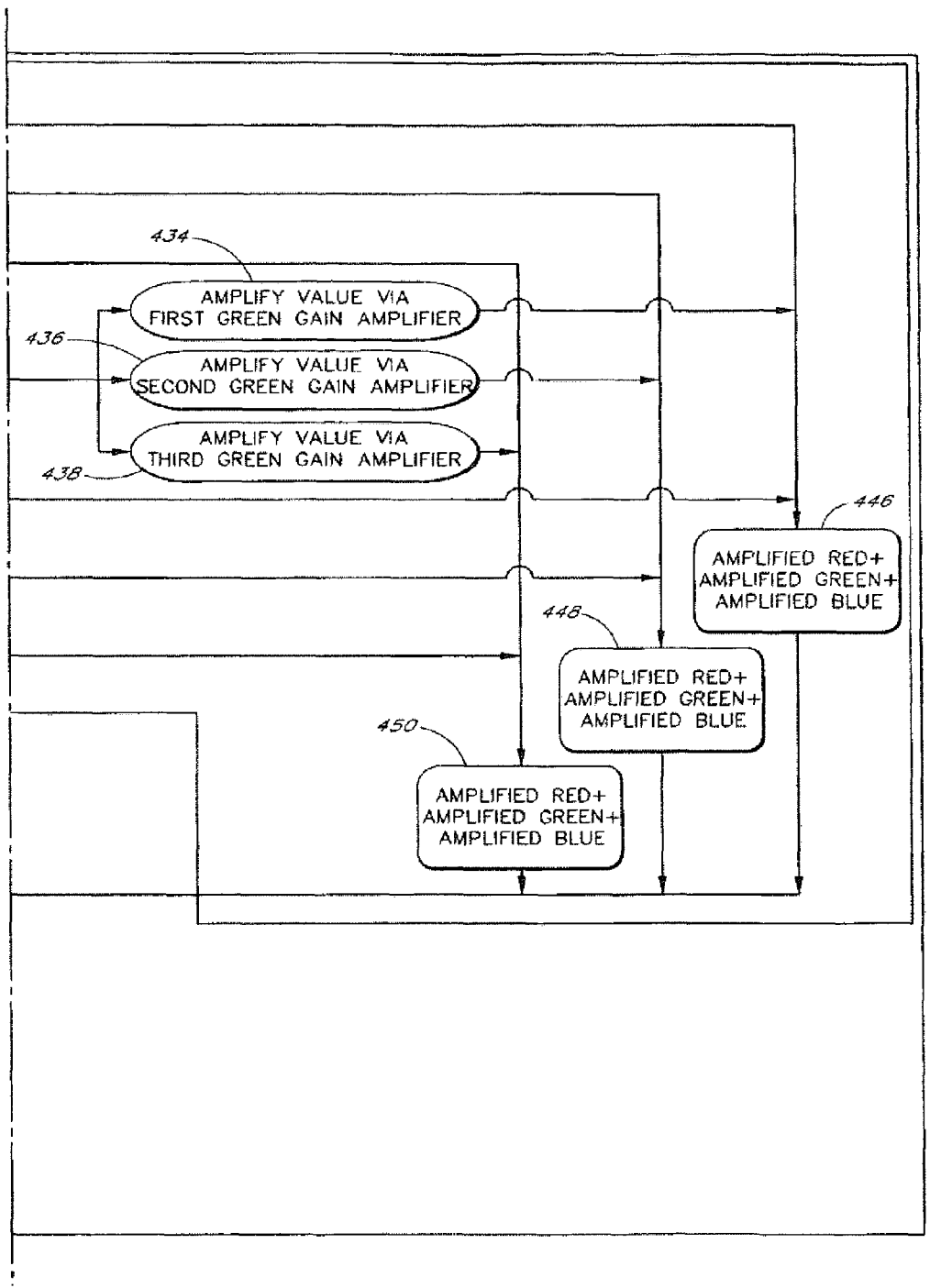

FIGS. 16, 16A and 16B (hereinafter referred as "FIG. 16") provide one embodiment of an analog white balance process performed by the system 390 of FIG. 15. In a block 420, the system 390 reads a 2×2 pixel block. In a process block 423, the system 390 may perform several acts substantially simultaneously (in parallel). In blocks 422 and 430, the system 390 determines the colors of the pixels. In blocks 424-428, the red pixel 190 is amplified by 3 red programmable amplifiers 398-402 (FIG. 15). In blocks 440, 447 and 444, the blue pixel 196 is amplified by 3 blue programmable amplifiers 410-414. In a block 432, the green pixel 192 that resides in an even column and odd row is multiplexed by the multiplexor 418 with the green pixel 194 that resides in an odd column and even row to produce one green value that is amplified by 3 green amplifiers 404-408. In blocks 446, 448 and 450, each of the amplified red components is summed with the corresponding amplified green and amplified blue components via 3 summing amplifiers 392, 394 and 396 (FIG. 15), and thus producing new red, green and blue components that are results of RGB convolutions.

In a block 452, the system 390 advances to the next column, new COLUMN=old COLUMN+1. In a block 454, the system 390 determines whether the system readout is exceeding the last pixel in a row. If not, the system 390 returns to process block 420. If yes, the system 390 advances to the next row, new ROW=old ROW+1, in a block 456. In a block 458, the system 390 determines whether the system readout is exceeding the last row in a frame. If not, the system 390 returns to process block 420. If yes, the system 390 stops in a stop block 460 and waits for further commands.

The acts in block 423 are performed substantially simultaneously. For example, the decision blocks 422 and 430 may be performed in parallel by reading two or more pixels simultaneously. As another example, blocks 424, 426, 428, may be performed in parallel by themselves or with blocks 440, 447, 444 and/or blocks 434, 436, 438. In other embodiments, the blocks may be performed in a sequence. The system 390 may further comprise storage circuits to store the values of the amplified red, green and blue components before they are summed in blocks 446, 448 and 450.

FIG. 17 presents embodiments of optional transfer functions 470, 472, 474, such as an exponent transfer function, for the programmable gain amplifiers 398-414 of FIG. 15. Each amplifier can implement a different transfer function and thus optimize each color for maximum dynamic range.

Figure 18:
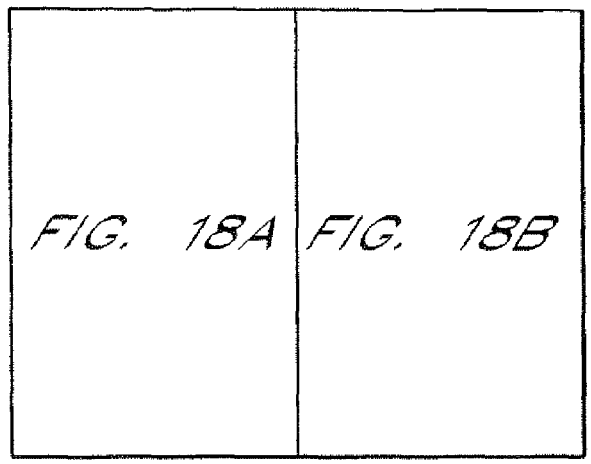
FIGS. 18, 18A and 18B provide an another embodiment of the process shown in FIG. 16.
Figure 18A:
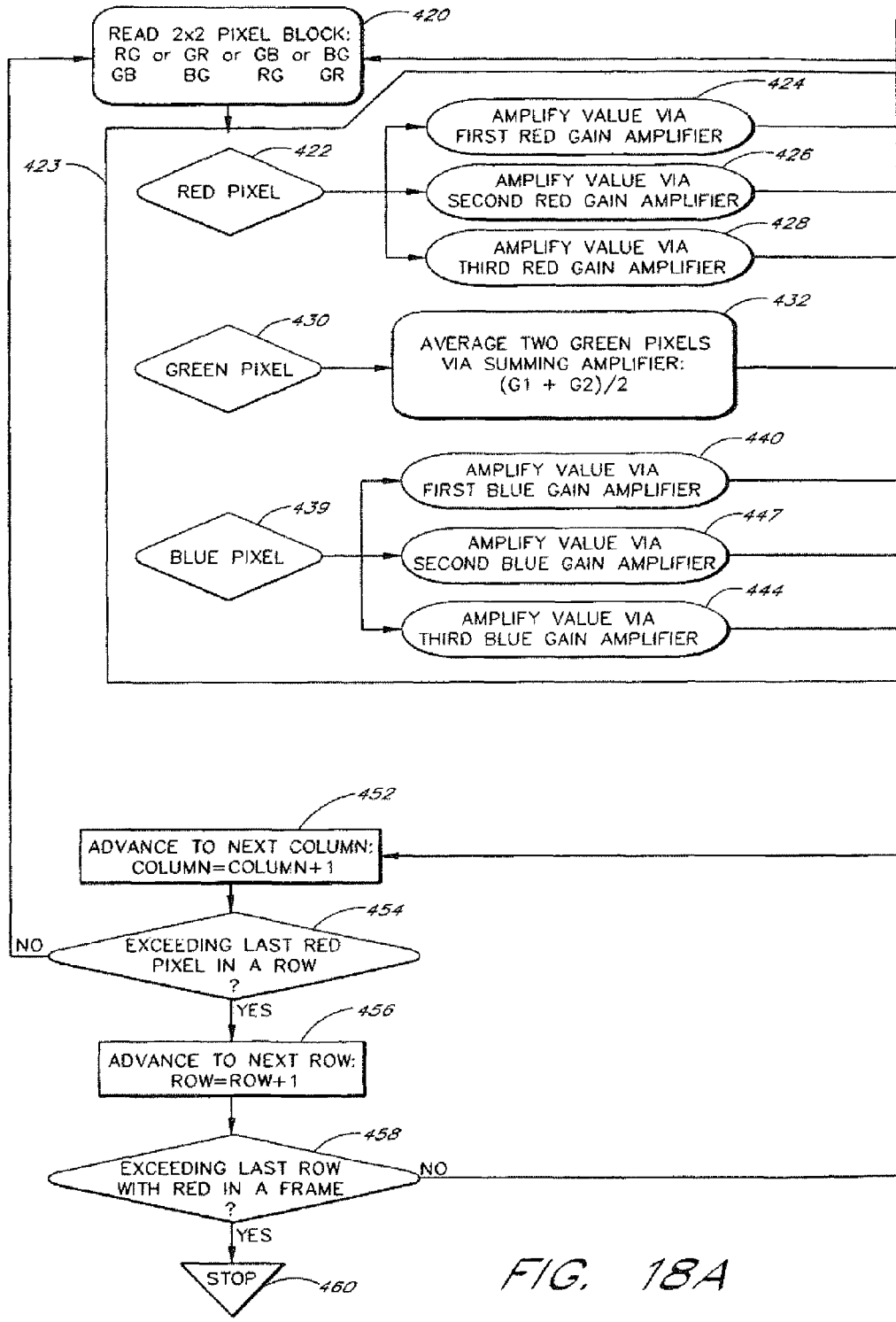
Figure 18B:
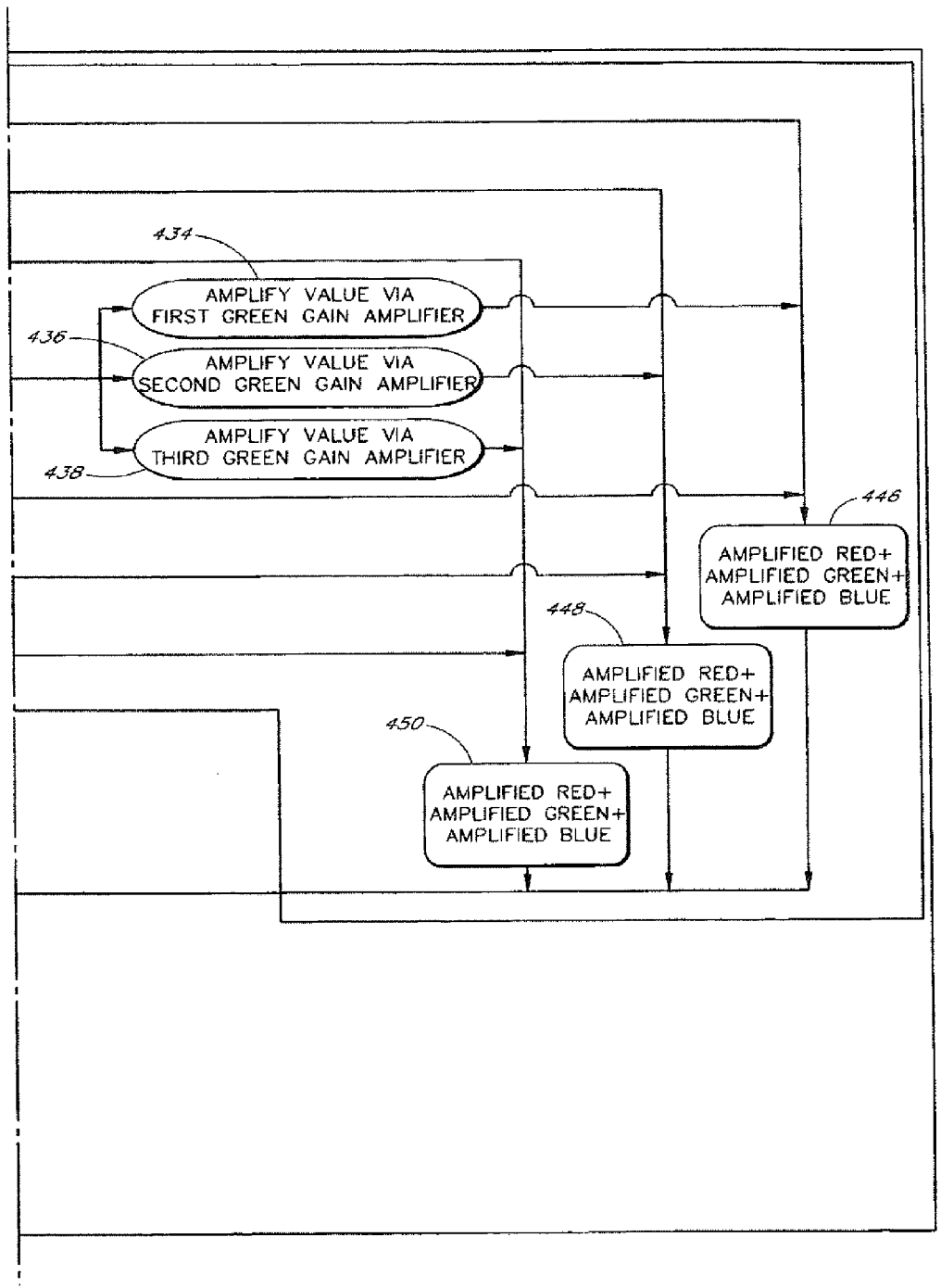

FIGS. 18, 18A and 18B (hereinafter referred as "FIG. 18") provide another embodiment of the process shown in FIG. 16. The process of FIG. 18 provides white balance and on-the-fly color interpolation. The process may be performed by the system 390 of FIG. 19. The process of FIG. 18 is similar to the process shown in FIG. 16, except the two green pixels are averaged by a summing amplifier 482 (FIG. 19) in a block 432 of FIG. 18. In FIG. 18, like the process in FIG. 16, some of the process blocks are performed in parallel. In other embodiments, the blocks may be performed in a sequence.

Figure 19:
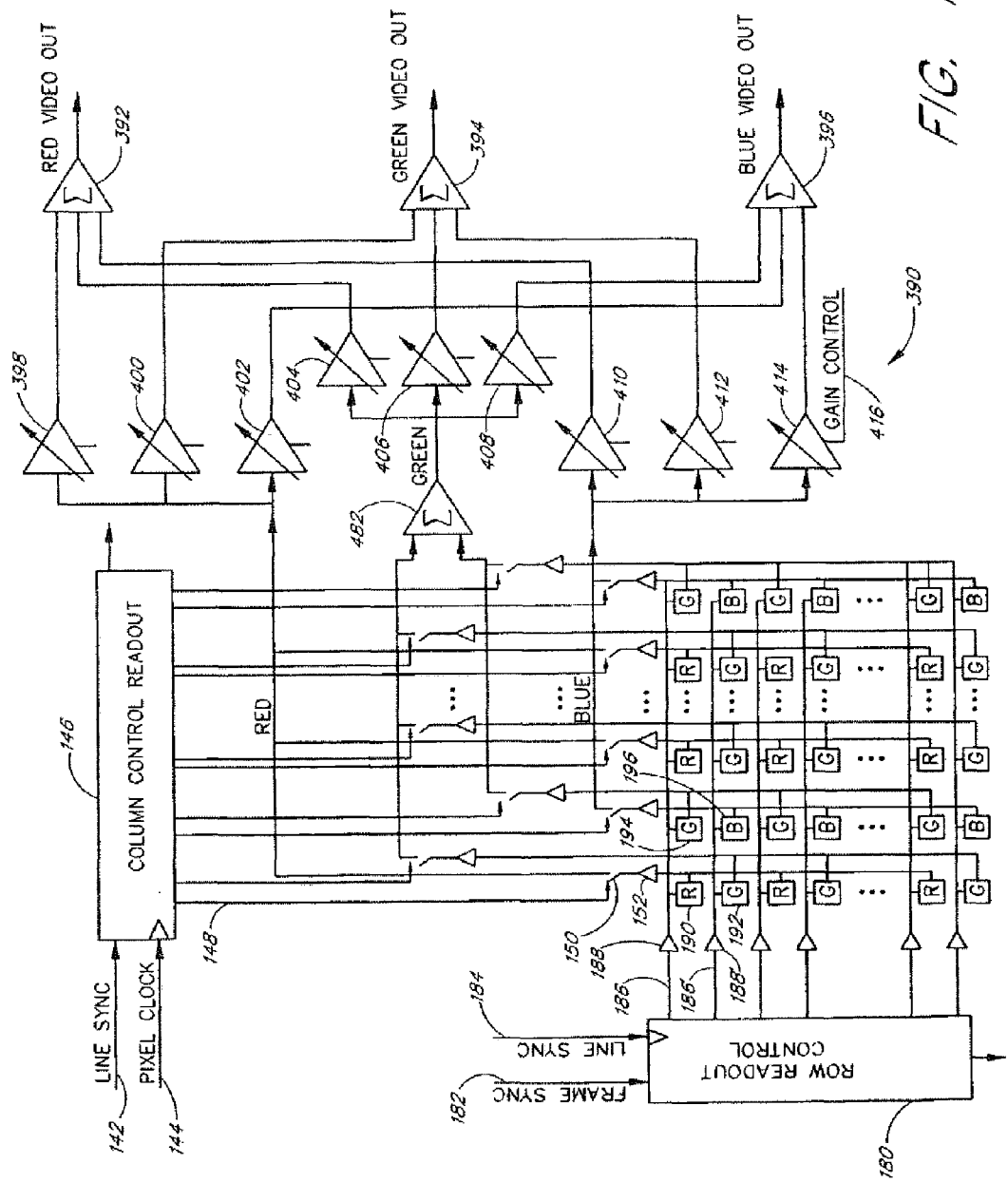
FIG. 19 illustrates another embodiment of a CMOS integrated circuit color imaging system with white balance.

FIG. 19 is another embodiment of a CMOS integrated circuit color imaging system 390 of the present invention with white balance. The system 390 of FIG. 19 is similar to the system 390 of FIG. 15, except the system 390 of FIG. 19 comprises a summing amplifier 482 instead of a multiplexor 418 in FIG. 15. The system 390 of FIG. 19 provides white balance and on-the-fly color interpolation.

Fixed Pattern Noise Reduction

Another aspect of the invention relates to a fixed pattern noise reduction apparatus and process. The fixed pattern noise reduction process reduces noise related to pixel-to-pixel variation. This variation is primarily due to dark current leakage, which may be integrated together with the signal and hence contaminate the signal. The dark current leakage may be due to thermal generation in the neutral bulk material, in the depletion region and due to surface states. The dark current level may vary between pixels and may be particularly noticeable between columns due to column buffers.

The fixed pattern noise reduction process of the present invention allows increased dynamic range (high image quality), high speed of operation and reduced computational complexity. The fixed pattern noise reduction of the present invention is advantageously performed in the analog domain before an analog-to-digital conversion.

Figure 20:
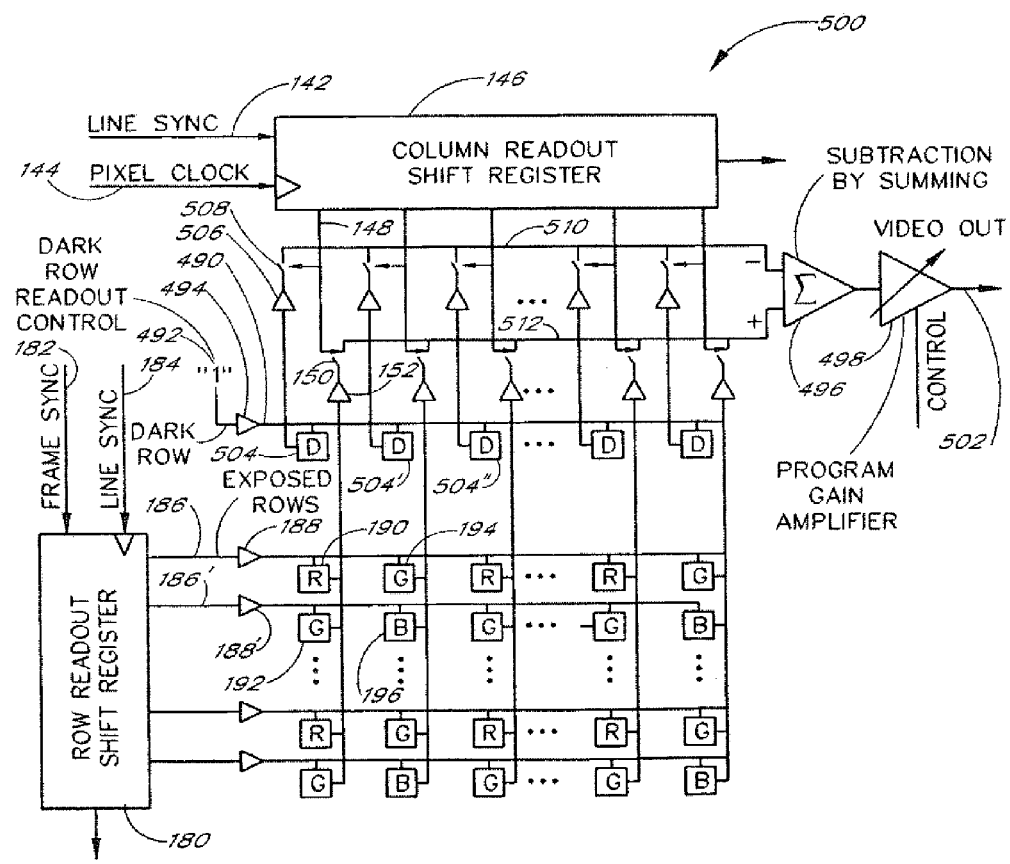
FIG. 20 illustrates one embodiment of an imaging system that supports fixed pattern noise reduction.

FIG. 20 illustrates one embodiment of an imaging system that supports fixed pattern noise reduction. Specifically, FIG. 20 illustrates one embodiment of a CMOS integrated circuit color imaging system 500 that supports on-the-fly fixed pattern noise reduction. In the illustrated embodiment, additional circuitry is not needed for post-processing in order to provide the fixed pattern noise reduction. The system 500 comprises a column readout shift register 146, a row readout shift register 180, a dark row readout control or path 492, a row of dark pixel sensor elements (dark row) 490, a first row of exposed pixel sensor elements 186, a second row of exposed pixel sensor elements 186', a summing amplifier 496, a programmable gain amplifier 498 and a plurality of switches 508.

In one embodiment, the dark pixels are deposited with an opaque mask layer and thus are not exposed to light. A row of pixels with dark pixels may be referred to as a "dark row." The system 500 presents an implementation for a red/green/blue (RGB)(primary color scheme) in a Bayer pattern with on-the-fly fixed noise reduction when windowing and sub-sampling are not active.

The system 500, however, is not limited to a Bayer pattern and/or the primary color scheme. Other embodiments may use other color schemes and/or other color patterns. Nor is the system 500 limited in its mode of operation. For example, the system 100 of FIG. 1 may be modified to support windowing and/or sub-sampling.

In FIG. 20, two pixels in the same column are read out simultaneously in response to signals from the column shift register 146, the row shift register 180 and the dark row readout control 492. One pixel is read from the dark row 490 and another pixel is read from the first exposed row 186. The dark pixel value is then subtracted from the exposed pixel value by the summing amplifier 496, thereby providing fixed pattern noise reduction. Additional gain is applied to the new value by the programmable gain amplifier 498. The dark row 490 may be re-used for each exposed row 186, 186'. The programmable readout control components 146, 180 ensure that the appropriate switches 508 are closed to allow the correct readout sequence.

Figure 21:
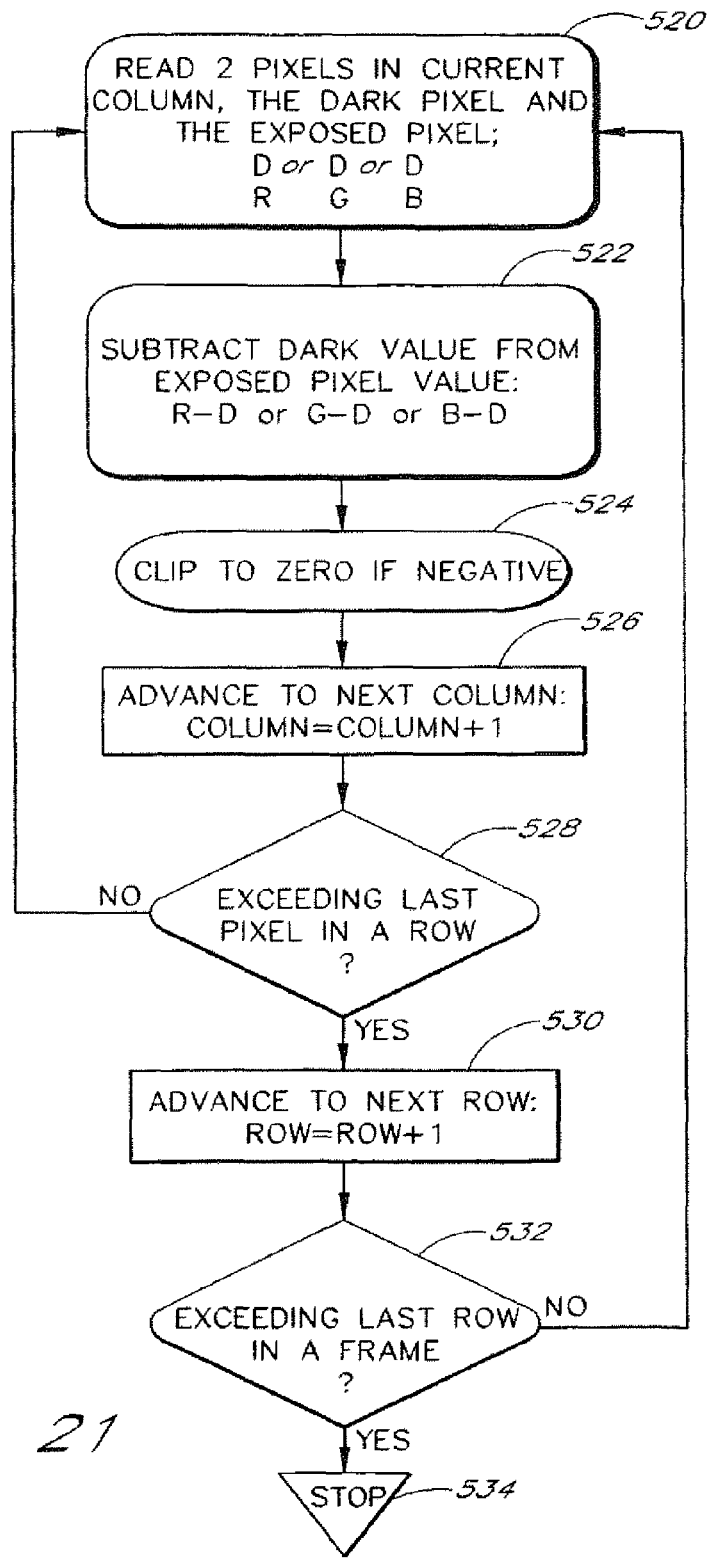
FIG. 21 illustrates one embodiment of a fixed pattern noise reduction process.

FIG. 21 illustrates one embodiment of a fixed pattern noise reduction process that may be performed by the system 500 of FIG. 20. Specifically, FIG. 21 illustrates one embodiment of an on-the-fly fixed pattern noise reduction process utilizing a single dark row 190. In FIG. 21, in a process block 520, the system 500 reads two pixels in a current column: a dark pixel in the dark row 490 and an exposed pixel in an exposed row 186. In a block 522, the summing amplifier 496 subtracts a value associated with the dark pixel from a value associated with the exposed pixel. In a block 524, the system 500 clips the difference found in block 522 to zero if the difference is negative. In a block 526, the system 500 advances to the next column of the system 500 in FIG. 20, new COLUMN=old COLUMN+1.

In a decision block 528, the system 500 determines whether the column shift register 146 has reached the last pixel in a row 186. If the column shift register 146 has not reached the last pixel in a row 186, then the system 500 returns to process block 520 to process the next column. If the column shift register 146 has reached the last pixel in a row 186, then the system 500 advances to the next row 186' in a process block 530, new ROW=old ROW+1. In a decision block 532, the system 500 determines whether the row shift register 180 has reached the last row in a frame of pixel sensor elements. If the row shift register 180 has not reached the last row in a frame of sensor elements, then the system 500 returns to process block 520 to process the first column in the next row 186'. If the row shift register 180 has reached the last row in the frame, then the system 500 may wait for a further command in an end block 534.

Figure 22:
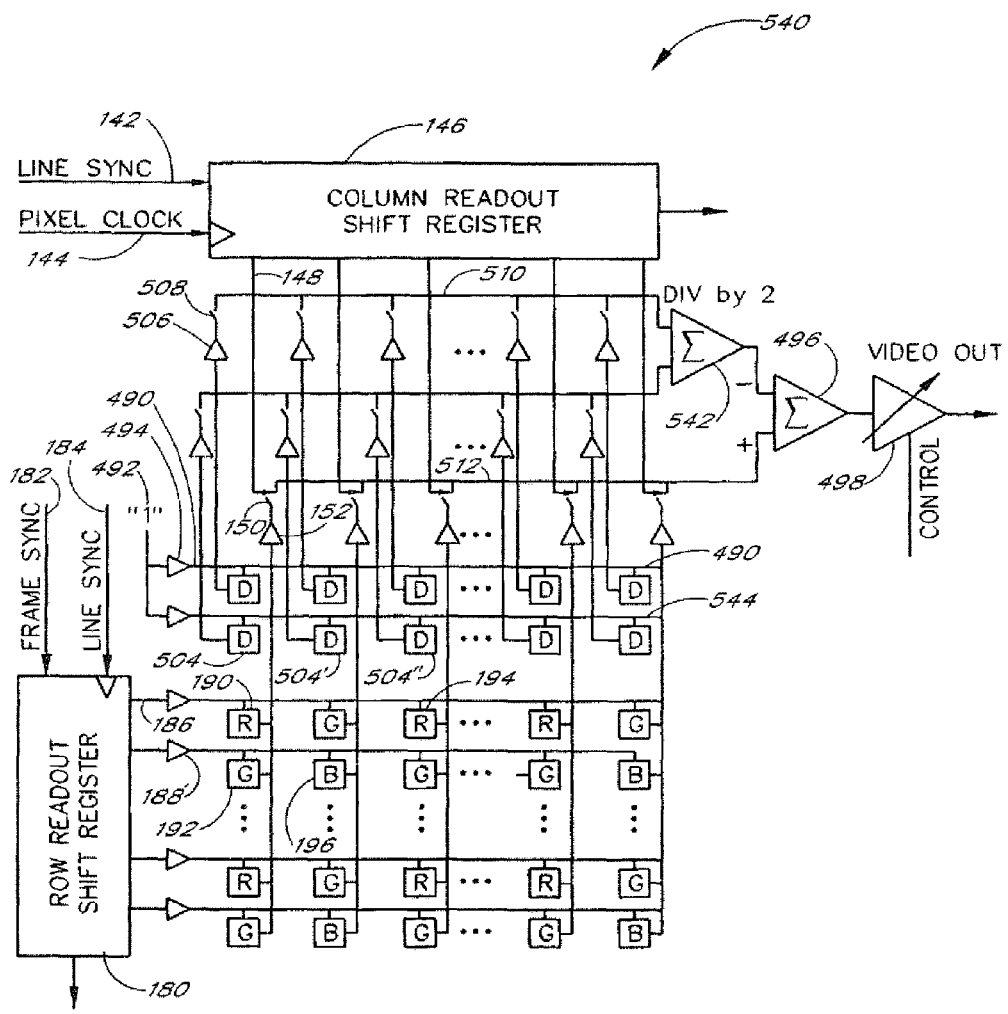
FIG. 22 illustrates another embodiment of an imaging system that supports fixed pattern noise reduction.

FIG. 22 illustrates another embodiment of an imaging system 540 that supports fixed pattern noise reduction. Specifically, FIG. 22 illustrates one embodiment of a CMOS integrated circuit color imaging system 540 that supports on-the-fly fixed pattern noise reduction with two dark rows. The imaging system 540 uses more than one dark rows for improved quality. Each image pixel value is preferably produced from a combination of a current exposed pixel and a dark current value that is the average of two dark pixels residing in the same column.

In FIG. 22, the system 540 comprises a column readout shift register 146, a row readout shift register 180, a dark row readout control or path 492, a first row of dark pixel sensor elements (first dark row) 490, a second row of dark pixel sensor elements (second dark row) 544, a first row of exposed pixel sensor elements 186, a second row of exposed pixel sensor elements 186', a first summing amplifier 542, a second summing amplifier 496, a programmable gain amplifier 498 and a plurality of switches 508. The system 540 presents an implementation for a red/green/blue (RGB)(primary color scheme) in a Bayer pattern with on-the-fly fixed noise reduction when windowing and sub-sampling are not active.

In another embodiment, the dark rows 490, 544 and/or individual dark pixels are distributed over the imaging array.

The system 540 is not limited to a Bayer pattern and/or the primary color scheme. Other embodiments may use other color schemes and/or other color patterns. Nor is the system 540 limited in its mode of operation. For example, the system 540 of FIG. 22 may be modified to support window and sub-sampling.

In FIG. 22, three pixels in the same column are read out simultaneously by the column shift register 146, the row shift register 180 and the dark rows readout path 492. Two pixels are read from the two dark rows 490, 544 and a third pixel is read from the first exposed row 186. The two dark pixels are then averaged by the first summing amplifier 542 to produce an average dark value. The average dark value is then subtracted from the exposed pixel by the second summing amplifier 496. Additional gain is applied to the new value by the programmable gain amplifier 498. The dark row 490 is re-used for each exposed row 186. The programmable readout control components 146, 180 ensure that the appropriate switches 508 are closed to allow the correct readout sequence.

In FIG. 22, the system 540 has two dark rows 490, 544 for producing average dark values. In other embodiments, there are more than two dark rows which are averaged. The fixed pattern noise reduction system of the present invention is not limited to two dark rows nor to any other particular number. The system 540 in FIG. 22 can be modified to average any number of dark rows prior to the subtraction from the exposed pixel by the summing amplifier 496.

Figure 23:
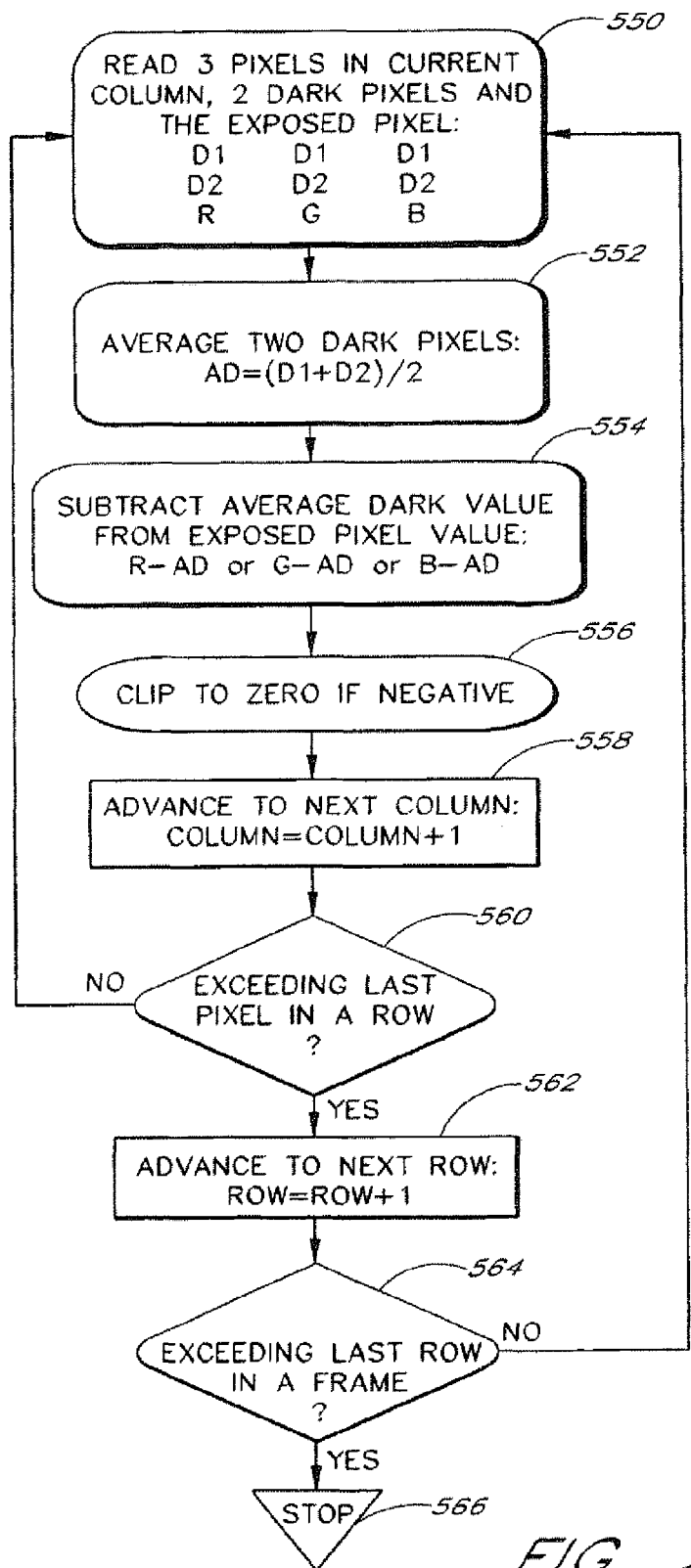
FIG. 23 illustrates another embodiment of a fixed pattern noise reduction process.

FIG. 23 illustrates one embodiment of an on-the-fly fixed pattern noise reduction process utilizing multiple dark rows 490, 544. The process of FIG. 23 may be performed by the system 540 of FIG. 22. In FIG. 23, in a process block 550, the system 540 reads three pixels in a current column: a dark pixel from each of the two dark rows 490, 544 and an exposed pixel in an exposed row 186. In a process block 552, the first summing amplifier 552 averages the values associated with the two dark pixels. In a process block 554, the second summing amplifier 496 subtracts the averaged dark pixel value from a value associated with the exposed pixel. In a process block 546, the system 540 clips the difference found in block 554 to zero if the difference is negative. In a process block 558, the system 540 advances to the next column.

In a decision block 560, the system 540 determines whether the column shift register 146 has reached the last pixel in a row 186. If the column shift register 146 has not reached the last pixel in a row 186, then the system 540 returns to process block 550 to process the next column. If the column shift register 146 has reached the last pixel in a row 186, then the system 540 advances to the next row 186' in a process block 562. In a decision block 564, the system 540 determines whether the row shift register 180 has reached the last row in a frame of pixel sensor elements. If the row shift register 180 has not reached the last row in a frame of sensor elements, then the system 540 returns to process block 550 to process the first column in the next row 105'. If the row shift register 180 has reached the last row in the frame, then the system 540 may wait for a further command in an end block 566.

Bad Pixel Correction

Figure 24:
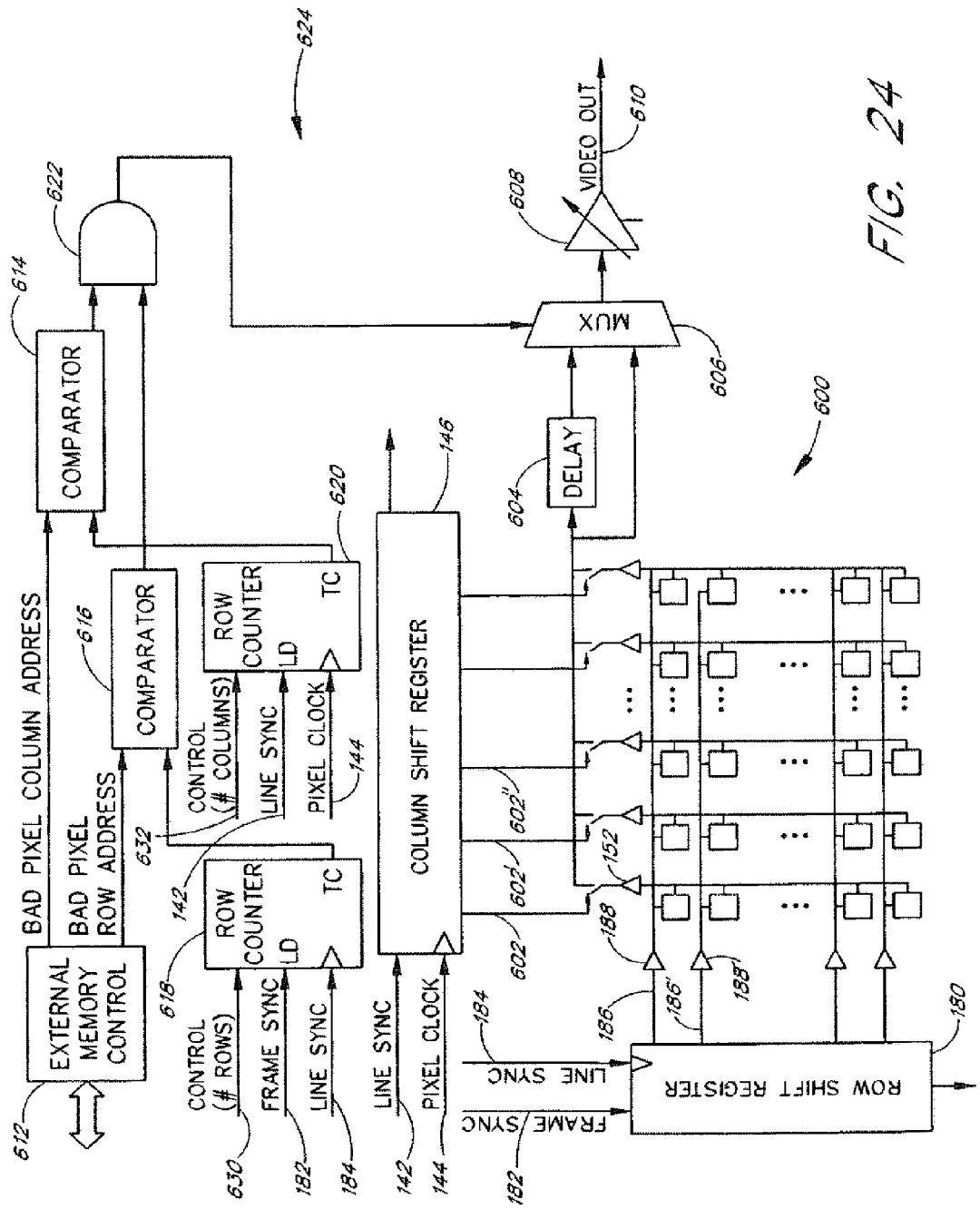
FIG. 24 illustrates one embodiment of a CMOS integrated circuit imaging device implementation that accommodates on-the-fly bad pixel correction.

In one embodiment, the imaging system contains a signal processing circuit 624 that allows bad pixel correction as shown in FIG. 24. FIG. 24 demonstrates an example of a CMOS integrated circuit imaging device implementation that accommodates on-the-fly bad pixel correction. The illustration presents an implementation for a monochrome on-the-fly bad pixel correction when windowing and sub-sampling are not active. However, the present invention is not limited to a monochrome imager, nor is limited in its mode of operation and can be realized to support window and sub-sampling.

In the embodiment shown in FIG. 24, a monochrome imaging system 600 employs a CMOS integrated circuit. The bad pixel correction system may be applied to CCD integrated circuits and/or different color filters.

FIG. 24 illustrates one embodiment of a CMOS integrated circuit imaging system 600 that accommodates on-the-fly bad pixel correction. In FIG. 24, the system 600 comprises a row shift register 180, a column shift register 146, buffers 188, 188', 152, row control lines 186, 186', column control lines 602, 602', 602", a delay 604, a multiplexer 606, an amplifier 608, a video out line 610, an external memory control 612, a row comparator 616, a column comparator 614, an AND gate 622, a row comparator 618, a column counter 620, a row control line 630 and a column control line 632. Other circuit configurations may be implemented in accordance with the present invention. In another embodiment of FIG. 24, a pipeline delay of two or more pixels is utilized. In a pipeline approach described below, a delay is not needed because one or more lines are stored such that the previous pixels are readily available for bad pixel correction.

In FIG. 24, the row control line 630 inputs the total number of rows into the row counter 618, and the column control line 620 inputs the total number of columns into the column counter 620. The color imaging system 600 provides an on-the-fly bad pixel correction process that is performed during the analog sensor readout stage. The signal processing circuit 624 identifies the addresses of the bad pixels via a list stored in an external memory accessed by the external memory control 612 and corrects any bad pixels on-the-fly. The list may be stored in a memory either on-chip or off-chip.

Figure 25:
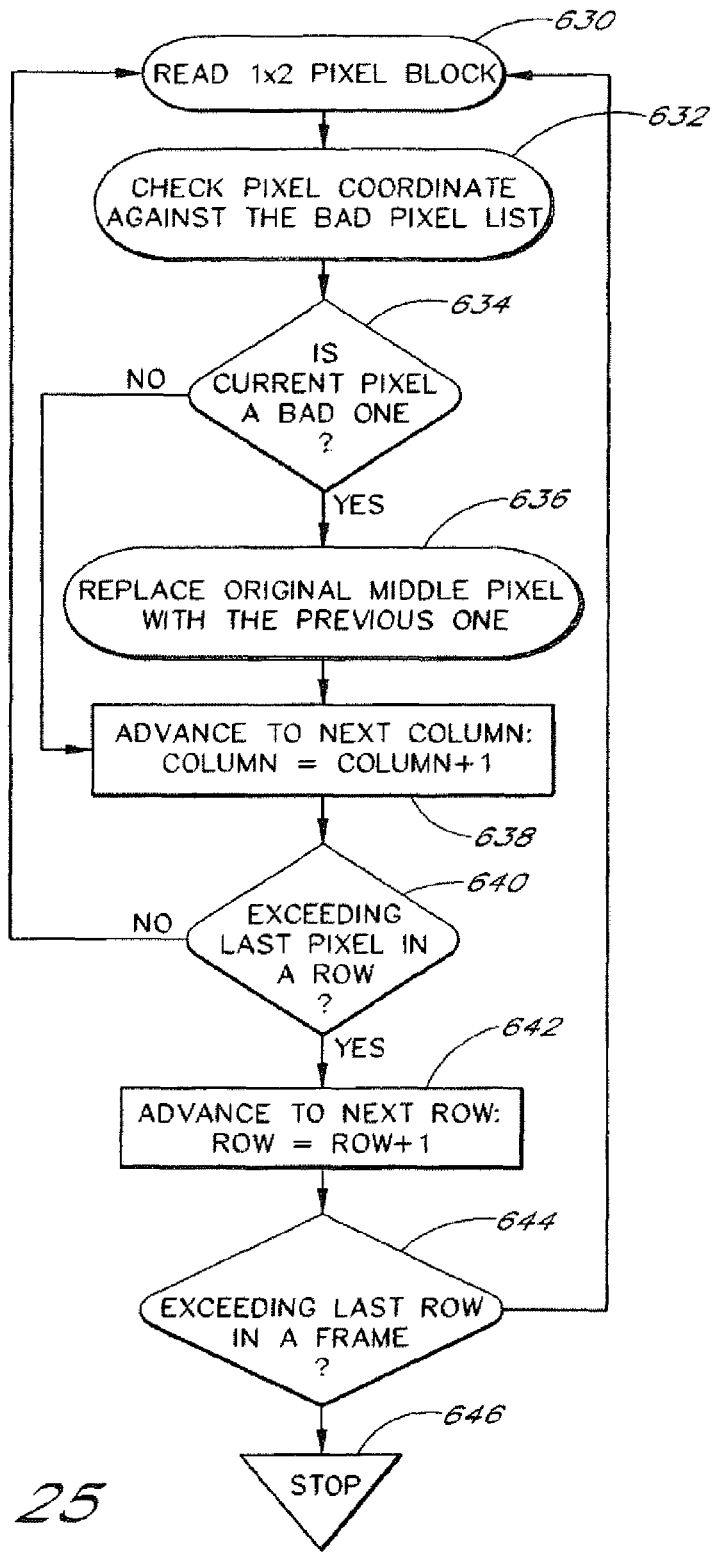
FIG. 25 illustrates a flowchart for the on-the-fly bad pixel correction of FIG. 24.

FIG. 25 illustrates a flowchart for the on-the-fly bad pixel correction of FIG. 24. The detection of bad pixels is performed off-line and a bad pixel list is stored in an external memory which is accessed by the external memory control 612. The correction process utilizes the list and replaces a defect pixel with its adjacent neighbor.

In a block 630 of FIG. 25, the circuit 600 reads consecutive horizontal pixels and amplifies the pixel readouts with an amplifier 608. The delay 604 provides a temporary pixel value storage. In a block 632, the row address comparator 616 and the column address comparator 614 compare the readout pixel address from the row and column counters 618, 620 with the stored list of defective pixel addresses. In a decision block 634, the circuit 624 determines if the current pixel is a bad one. If the comparison is positive, the output of the AND gate is 1, and the current pixel is replaced by the preVious adjacent pixel that is stored in the delay 604, as shown in a block 636. If the comparison is negative, the output of the AND gate is 0, and the column shift register 146 advances to the next column in a block 638. The blocks 640-646 are substantially similar to the blocks 214-220 in FIG. 6 described above.

The on-the-fly bad pixel correction embodiment may be combined with various readout modes such as windowing and sub-sampling, and additional signal processing such as on-the-fly color interpolation. The bad pixel correction system of the present invention is not limited to monochrome imaging systems and is applicable to integrated circuit color imaging systems as well. The color imaging system may utilize any color filter scheme such as the primary color system (RGB) in a Bayer pattern, a complementary color system or others. The imaging system may also use a non-rectangle matrix of pixels. A similar implementation can provide on-the-fly bad pixel correction for color imaging systems and/or different pixel topography via modification to the readout control, the pixel neighborhood size and configuration. For example, a color imaging system with an RGB Bayer pattern may use 3 horizontally consecutive pixels, i.e., pipeline delay of 3 pixels and 2 registers for temporary storage. So each color component when defective, can be replaced by the corresponding pixel with the same color component.

In other embodiments of the systems illustrated in FIGS. 4, 8, 13, 15, 19, 20, 22, the systems may further include one or more rows, and/or columns of capacitors to read and store pixel sensor values to accommodate serial readout of pixels. Using capacitors to store values reduces the number and complexity of the lines (buses) coupled the pixel sensor elements. The size of the pixel sensor elements, the size of the sensor array, the space on the chip and the placement of the components are design choices of the manufacturer.

The present invention does not require the integrated color imaging system to employ a simultaneous readout of the n-by-n pixel block. A 'pipeline' approach may be utilized instead of a parallel readout. The pipeline approach uses one or more analog line storage units, e.g., capacitors. For example, in one embodiment using the Bayer color pattern, two line storage units are used. The first of two consecutive lines that is readout from the array is stored in the first line storage unit. The second line is averaged with the stored line to produce the RGB triplets, while a "first" line of the next two consecutive lines is readout and stored in the second line storage unit and so on. Thus, the two line storage units are used in a 'ping pong' fashion.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed:

1. A device comprising:
   an array of sensors configured in a row-column format to capture image data through a color filter having different color filter components;
   an array controller configured to select subsets of the sensors for readout, wherein a group of multiple sensors in a column of sensors are included in each of a plurality of the subsets of the sensors; and
   a compensation system configured to compensate the image data readout from the subsets of the sensors based on the color filter components associated with the sensors in the subsets of sensors.

2. The device of claim 1, wherein the compensation system further comprises:
   a first amplifier configured to compensate the image data readout from sensors corresponding to a first color filer component of the color filter;
   a second amplifier configured to compensate the image data readout from sensors corresponding to a second color filer component of the color filter; and
   a third amplifier configured to compensate the image data readout from sensors corresponding to a third color filer component of the color filter.

3. The device of claim 2, wherein the compensation system further comprises a summing amplifier configured to average the image data readout from sensors corresponding to the third color filer component, and wherein the third amplifier is configured to compensate the image data averaged by the summing amplifier.

4. The device of claim 1, wherein the array controller is configured to direct a readout of the image data from a first subset of the sensors sequentially with a readout of a second subset of the sensors.

5. The device of claim 4, wherein the image data is readout of the first subset of the sensors in parallel, and wherein the image data is readout of the second subset of the sensors in parallel.

6. The device of claim 4, wherein the first subset of the sensors at least partially overlaps with the second subset of the sensors.

7. The device of claim 1, wherein the array of the sensors includes at least one masked sensor blocked from light exposure, and wherein the compensation system is configured to determine a difference in color response between the image data readout from at least one sensor in the subsets of the sensors and the masked sensor, and wherein the compensation system is configured to compensate the difference in the color response.

8. The device of claim 7, wherein the array controller is configured to direct readout of the masked sensor in parallel with at least one of the subsets of the sensors.

9. A method comprising:
   capturing image data with an array of sensors through a color filter having different color filter components;
   selecting subsets of the sensors for readout, wherein a plurality of the subsets of the sensors overlap by multiple sensors in a column of sensors; and
   compensating the image data readout from the subsets of the sensors based on the color filter components associated with the sensors in the subsets of sensors.

10. The method of claim 9, wherein compensating the image data readout from the subsets of the sensors further comprises:
    compensating, with a first amplifier, the image data readout from sensors corresponding to a first color filer component of the color filter;
    compensating, with a second amplifier, the image data readout from sensors corresponding to a second color filer component of the color filter; and
    compensating, with a third amplifier, the image data readout from sensors corresponding to a third color filer component of the color filter.

11. The method of claim 10, wherein compensating the image data readout from the subsets of the sensors further comprises:
    averaging, with a summing amplifier, the image data readout from sensors corresponding to the third color filer component; and
    compensating, with the third amplifier, the image data averaged by the summing amplifier.

12. The method of claim 9, further comprising directing a readout of the image data from a first subset of the sensors sequentially with a readout of a second subset of the sensors.

13. The method of claim 12, wherein the image data is readout of the first subset of the sensors in parallel, and wherein the image data is readout of the second subset of the sensors in parallel.

14. The method of claim 12, wherein the first subset of the sensors at least partially overlaps with the second subset of the sensors.

15. The method of claim 9, wherein the array of the sensors includes at least one masked sensor blocked from light exposure, and wherein compensating the image data readout from the subsets of the sensors further comprises determining a difference in color response between the image data readout from at least one sensor in the subsets of the sensors and the masked sensor, and compensating the difference in the color response.

16. The method of claim 15, further comprising directing readout of the masked sensor in parallel with at least one of the subsets of the sensors.

17. A device comprising:
an array of sensors including a first group of sensors configured to sense light and a second group of sensors blocked from light exposure;
an array controller configured to select subsets of sensors from the first group of sensors for readout and to select at least one sensor in the second group of sensors for readout, wherein multiple sensors in a column of sensors are included in a plurality of the subsets of the sensors; and
a compensation system configured to reduce fixed pattern noise in light sensed the first group of sensors based on the readout from the at least one sensor in the second group of sensors.

18. The device of claim 17, wherein the compensation system is configured to determine a difference between the light sensed by the at least one sensor in the first group of sensors and the at least one sensor in the second group of sensors, and to reduce fixed pattern noise in light sensed the first group of sensors based on the determined difference.

19. The device of claim 18, wherein the compensation system is configured to clip the determined difference when the determined difference is negative.

20. The device of claim 17, wherein the compensation system is configured to average readouts from multiple sensors in the second group of sensors, to determine a difference between the light sensed by the at least one sensor in the first group of sensors and the average readout from multiple sensors in the second group of sensors, and to reduce fixed pattern noise in light sensed the first group of sensors based on the determined difference.

21. The device of claim 17, wherein the array controller configured to select subsets of sensors from multiple consecutive rows and multiple consecutive columns of the first group of sensors.

22. The device of claim 17, wherein the compensation system configured to compensate image data readout from the subsets of the sensors based on a color filter overlaying the subsets of sensors from the first group of sensors.

23. The device of claim 22, wherein the compensation system further comprises:
a first amplifier configured to compensate the image data readout from sensors corresponding to a first color filer component of the color filter;
a second amplifier configured to compensate the image data readout from sensors corresponding to a second color filer component of the color filter; and
a third amplifier configured to compensate the image data readout from sensors corresponding to a third color filer component of the color filter.

24. A method comprising:
selecting subsets of sensors from a first group of sensors for readout, wherein multiple sensors in a column of sensors are included in a plurality of the subsets of the sensors;
prompting readout of light sensed from at least one of the subsets of sensors in the first group of sensors and from at least one sensor in a second group of sensors blocked from light exposure; and
reducing fixed pattern noise in light sensed the first group of sensors based on the readout from the at least one sensor in the second group of sensors.

25. The method of claim 24, further comprising:
determining a difference between the light sensed by the at least one sensor in the first group of sensors and the at least one sensor in the second group of sensors; and
reducing fixed pattern noise in light sensed the first group of sensors based on the determined difference.

26. The method of claim 25, further comprising clipping the determined difference when the determined difference is negative.

27. The method of claim 24, further comprising:
averaging readouts from multiple sensors in the second group of sensors;
determining a difference between the light sensed by the at least one sensor in the first group of sensors and the average readout from multiple sensors in the second group of sensors; and
reducing fixed pattern noise in light sensed the first group of sensors based on the determined difference.

28. The method of claim 24, further comprising selecting the subsets of sensors from multiple consecutive rows and multiple consecutive columns of the first group of sensors.

29. The method of claim 24, further comprising compensating image data readout from the subsets of the sensors based on a color filter overlaying the subsets of sensors from the first group of sensors.

30. The method of claim 29, wherein compensating image data readout from the subsets of the sensors further comprising:
compensating, with a first amplifier, the image data readout from sensors corresponding to a first color filer component of the color filter;
compensating, with a second amplifier, the image data readout from sensors corresponding to a second color filer component of the color filter; and
compensating, with a third amplifier, the image data readout from sensors corresponding to a third color filer component of the color filter.

* * * * *